United States Patent
Oya et al.

(10) Patent No.: US 7,423,669 B2
(45) Date of Patent: Sep. 9, 2008

(54) MONITORING SYSTEM AND SETTING METHOD FOR THE SAME

(75) Inventors: Takashi Oya, Yokohama (JP); Tomoaki Kawai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 708 days.

(21) Appl. No.: 11/085,740

(22) Filed: Mar. 21, 2005

(65) Prior Publication Data

US 2005/0213793 A1  Sep. 29, 2005

(30) Foreign Application Priority Data

Mar. 23, 2004 (JP) .............................. 2004-085510
Mar. 15, 2005 (JP) .............................. 2005-073335

(51) Int. Cl.
H04N 5/228 (2006.01)
H04N 5/225 (2006.01)
H04N 5/262 (2006.01)

(52) U.S. Cl. .............................. 348/208.14; 348/207.1; 348/207.11; 348/240.99

(58) Field of Classification Search ............ 348/208.14, 348/207.1, 207.11, 240.99
See application file for complete search history.

(56) References Cited

U.S. PATENT DOCUMENTS

| | | | |
|---|---|---|---|
| 6,469,737 B1 * | 10/2002 | Igarashi et al. ............ | 348/211.3 |
| 6,985,178 B1 * | 1/2006 | Morita et al. ............. | 348/211.3 |
| 2003/0025803 A1 * | 2/2003 | Nakamura et al. ........ | 348/218.1 |
| 2003/0184651 A1 * | 10/2003 | Ohsawa et al. ........... | 348/207.1 |
| 2006/0114326 A1 * | 6/2006 | Tanaka ................... | 348/207.11 |

* cited by examiner

Primary Examiner—James M Hannett
(74) Attorney, Agent, or Firm—Cowan, Liebowitz & Latman, P.C.

(57) ABSTRACT

In order to facilitate a setting of multiple parameters of a tracking function of a camera, in a setting window, an image display window is displayed in which a picked-up image sent from a camera server and an indicator indicating a change detection maximum area as a detection result of an image change detection process by the camera server are superimposingly on the picked-up image. In addition, in the setting window, a window is displayed in which a setting window is displayed which is used to make a setting of a tracking method by referring to an image displayed in the image display window.

9 Claims, 20 Drawing Sheets

US 7,423,669 B2

1

MONITORING SYSTEM AND SETTING METHOD FOR THE SAME

BACKGROUND OF THE INVENTION

1. Field of the Invention

The present invention relates to a monitoring system, which uses a camera having a photographing object tracking function, and to a setting method for the monitoring system.

2. Related Background Art

In recent years, a video image distribution system, in which a video image taken by a camera is distributed through a network and a monitoring system, in which an indoor or outdoor predetermined monitoring zone is monitored using a camera are becoming widespread. In addition, a network camera having a server function connectable to a network and a set-top box for connecting the camera to the network are commercialized. Such the network camera is generally referred to as the "camera server", and there is known a camera server having a function of detecting a change of an image (resulting from a situation where, for instance, a suspicious person has entered into a predetermined monitoring zone) and activating a warning apparatus.

With the conventional technique described above, however, a client connected to the camera server through a network is arranged at a place remote from the camera server, so when multiple parameters of a tracking function of the camera are set, it is difficult to know the degree of influence of the parameter change on tracking process of the camera. One conceivable factor of this problem is, for instance, that an actual tracking target portion in a monitoring area is not displayed when the tracking function parameters are set on a client side.

SUMMARY OF THE INVENTION

The present invention has been made in order to solve the problem described above and has an object to provide a system which makes it possible to easily make a setting of a tracking function of a camera at a setting client.

In order to attain at least one object such as described above, in an embodiment of the present invention, in a setting window, an image display window is displayed in which a photographed or captured image sent from a camera server and an indicator indicating a change detection maximum area as a detection result of image change detection process by the camera server are superimposingly displayed. In addition, in the setting window, a setting window for setting a tracking method by referring to an image displayed in the image display window is displayed. With this construction, it becomes possible to make the setting of the tracking function of the camera with ease.

Other objects and features of the present invention will become apparent from the following description to be made with reference to the accompanying drawings.

DESCRIPTION OF THE PREFERRED EMBODIMENTS

Hereinafter, an embodiment of the present invention will be described.

In this embodiment of the present invention, a monitoring system is formed by a camera server and a setting client for an administrator (user). More specifically, in this embodiment, when a setting concerning a tracking function executed at the camera server is made at the setting client, progress or a final result of a tracking process of the camera server is sent to the setting client through a network and a resetting process is performed at the setting client based on the sent information.

Figure 1:
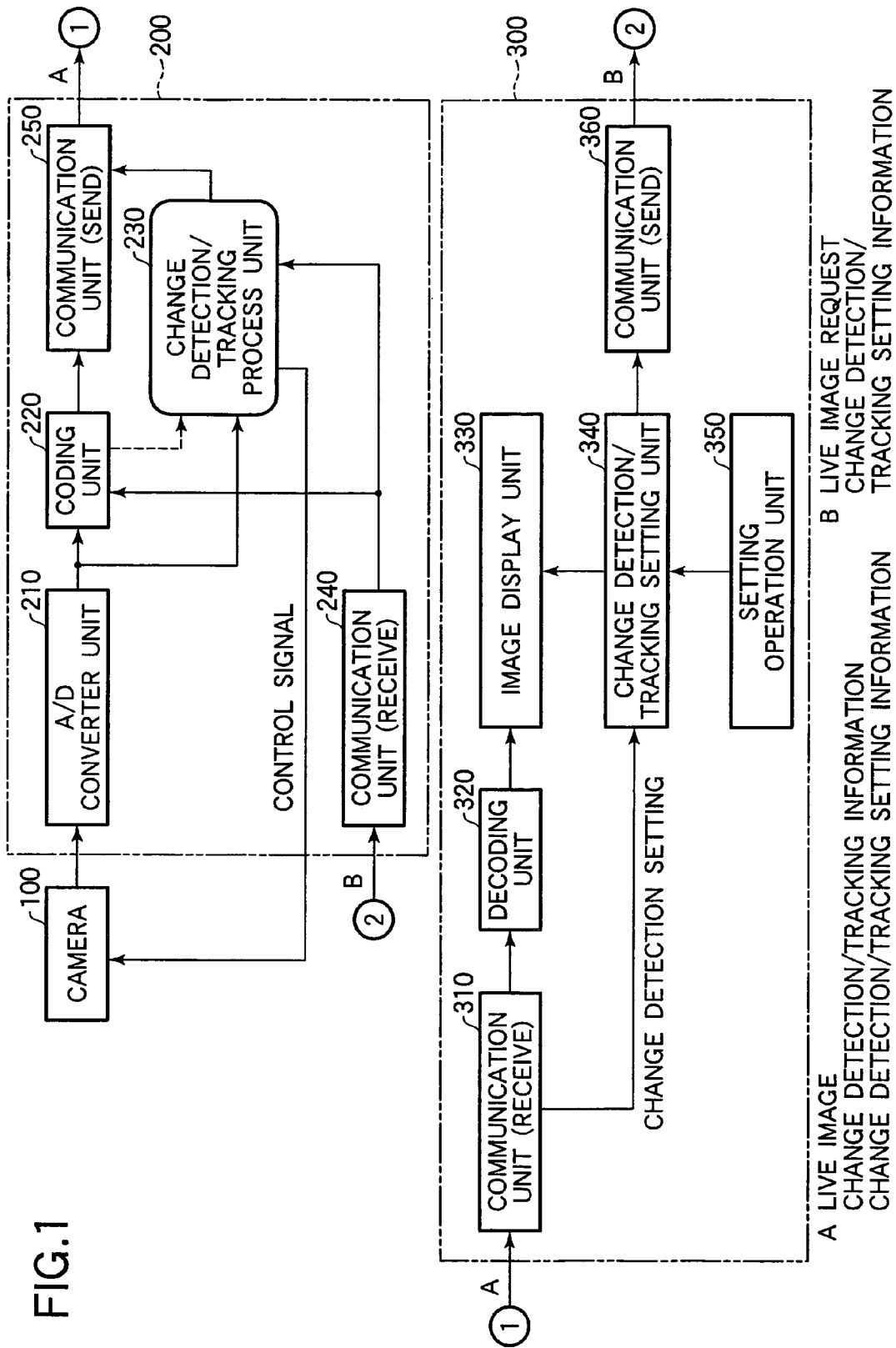
FIG. 1 is a block diagram showing an example of constructions of a camera server and a setting client of a monitoring system according to an embodiment of the present invention.

FIG. 1 is a block diagram showing an example of a construction of a monitoring system according to this embodiment.

In FIG. 1, the monitoring system includes a camera 100, a camera server 200, and a setting client 300. The camera server 200 includes an A/D converter unit 210, a coding unit 220, a change detection/tracking process unit 230, a communication unit (receive) 240, and a communication unit (send) 250. The communication units 240 and 250 may be constructed as a single unit. The change detection/tracking process unit 230 detects movements in an image based on a control program and executes an object tracking process based on a result of the detection.

Also, the setting client 300 includes a communication unit (receive) 310, a decoding unit 320, an image display unit 330, a change detection/tracking setting unit 340, a setting operation unit 350, and a communication unit (send) 360. The communication units 310 and 360 may be constructed as a single unit. The change detection/tracking setting unit 340 executes a process shown in a flowchart in FIG. 7 based on a control program.

In FIG. 1, reference symbol A indicates transmission of a live image picked-up by the camera 100 and change detection/tracking information to the setting client 300 and reception of the change detection/tracking information by the setting client 300. Also, reference symbol B indicates reception of a live image request and a change detection/tracking setting request from the setting client 300 by the camera server 200.

The camera server 200 is capable of sending the live image picked up by the camera 100 to the setting client 300 through the network. The setting client 300 receives and displays a result of image change detection process/tracking process sent from the camera server 200 through the network together with the live image.

It is possible to freely change settings concerning the image change detection function and the tracking function of the camera server 200 while checking the sent image. More specifically, setting values are changed by a setting person (user) at the setting client 300 using a graphical user interface (GUI). Then, the changed setting values are sent to the camera server 200. The camera server 200 receives the setting values sent from the setting client 300 and performs the image change detection process and the tracking process based on the received setting values afterward.

The setting client 300 obtains an image from the camera server 200 using, for instance, a system where when a Uniform-Resource-Locator (URL)-encoded command is sent by Hypertext Transfer Protocol (HTTP), images in multiple frames are returned. Note that it is assumed in this embodiment that the network is the Internet, although the present invention is not limited to this so long as the network is a transmission path that is capable of transmitting digital signals and has a capacity enough for image communication.

The camera server 200 is connected to the camera 100 whose pan/tilt (photographing direction), zoom, and the like are controllable, although there occurs no problem even when an integral form is used in which the camera 100 and the main body 200 are disposed in the same enclosure.

First, an internal construction of the camera server 200 will be described by centering on a construction associated with an image process.

At the camera server 200, an image signal inputted from the camera 100 is digitized by the A/D converter unit 210 and is coded by the coding unit 220. Here, there are various coding systems such as Joint Photographic Experts Group (JPEG) and Moving Picture Experts Group (MPEG). This embodiment is not limited to a specific coding system, although the JPEG system is a system where an image is divided into blocks having a predetermined size and the image change detection in this embodiment is performed by utilizing the division into blocks.

After the coding of the image, the change detection/tracking process unit 230 performs an image change detection process for detecting movements of an object in the image and a process for tracking the detected object. The coded image and a result of the image change detection process/tracking process are sent from the communication unit (send) 250 to the setting client 300 through the network in accordance with a request from the setting client 300. Also, various settings concerning the image change detection function and the tracking function of the camera server are changed by the setting client 300 and information about the change is sent from the setting client 300 through the network and is received by the communication unit (receive) 240.

There are various image change detection process systems such as a system, in which the image change detection is performed based on inter-adjacent-frame differences, and a system where the image change detection is performed based on background differences. Among these difference systems, the inter-adjacent-frame difference system is a system where absolute values of lightness differences between pixels whose coordinates are the same, absolute value sums of DCT coefficient differences in units of JPEG coding blocks, and the like are used as the characteristic amounts of the inter-adjacent-frame differences and it is judged that a change exists in an image when a value obtained by integrating the amounts as to the whole of the image exceeds a predetermined threshold. Depending on which difference system is used, it is determined whether an image after coding is inputted into the change detection/tracking process unit 230 or an image before the coding is inputted thereinto, so two image input paths into the change detection/tracking process unit 230 are illustrated in FIG. 1 using a solid arrow and a dotted arrow.

This embodiment is not limited to a specific image change detection process system, although for the sake of explanation, it is assumed that the inter-adjacent-frame difference system is used in which absolute value sums of DCT coefficient differences are obtained in units of JPEG coding blocks. In this case, occurrence of an image change detection event is determined by, for instance, three thresholds that are sensitivity, an area ratio, and a continuous time.

With the sensitivity, when an absolute value sum of DCT coefficient differences in a JPEG coding block exceeds a certain threshold, it is judged that an image change has occurred in the block. Here, as the sensitivity is increased, the threshold is reduced and detection of a smaller image change becomes possible. Also, with the area ratio, when the ratio of the number of blocks, in each of which a change has occurred, to the total number of blocks belonging to a change detection target area (composed of blocks having a predetermined size) determined in an image exceeds a certain threshold, it is judged that an image change has been detected. Further, with the continuous time, when a change detected based on the area ratio described above continues for a certain threshold time or more, it is finally judged that an image change has been detected and an image change detection event occurs at this point in time.

The camera server 200 has two operation states that are an image change detection state and a tracking state. When the operation state of the camera server 200 is the image change detection state, an image change detection process for detecting movements of a photographing object is performed under a state where the camera is stopped at the time of image pickup. Also, when an image change is detected, the operation state of the camera server 200 changes from the image change detection state to the tracking state. In a process under the tracking state, at the camera server 200, an area, in which a large change is detected, on an image is recognized as a moving object and control is performed so that the line of sight of the camera 100 is directed so that the moving object is positioned at the center of a pickup screen.

More specifically, after making a judgment as to the presence or absence of a change in units of blocks, the change detection/tracking process unit 230 obtains the centroid of an area (maximum area) of a collection of the maximum number of blocks among the blocks in each of which a change has been detected. When the area of the maximum area is equal to or more than a predetermined certain value, a displacement amount of the obtained centroid point from an image center is converted into a camera 100 pan/tilt control amount and the camera 100 is controlled so that the centroid of the maximum area becomes the image center.

Also, the change detection/tracking process unit 230 sends the positions of the blocks belonging to the maximum area used for the tracking process and the centroid coordinates of the maximum area to the setting client 300 from the communication unit (send) 250.

When the camera 100 stops its operation, the change detection/tracking process unit 230 starts the inter-adjacent-frame difference process for the image change detection again. However, in the tracking state, after the inter-adjacent-frame difference process, the change detection/tracking process unit 230 performs area division process again and continues the tracking process when the area of the maximum area is equal to or more than the predetermined certain value. On the other hand, when the area of the maximum area is not equal to or more than the predetermined certain value and an area having a large area is not found continuously for a predetermined certain time or more, the change detection/tracking process unit 230 ends the tracking process and returns to an ordinary image change detection process when the next image is obtained.

Next, an internal construction of the setting client 300 will be described.

At the setting client 300, the communication unit (receive) 310 receives an image signal from the camera server 200 through the network, the decoding unit 320 decodes the received image signal, and the image display unit 330 displays an image. The communication unit (receive) 310 also receives results of the image change detection process and the tracking process performed at the camera server 200. Information concerning the results of the image change detection process and the tracking process contains the change detection target area, the area ratio of the total sum of blocks, in each of which a change has occurred, to the change detection target area, the presence or absence of image change detection in each change detection block, information concerning an area (maximum area) of a collection of the maximum number of blocks among the blocks, in each of which a change has been detected, and the centroid position of the area, information concerning the start time and the end time of the tracking state, and the like, with these information being displayed on a display screen of the image display unit 330. Note that the change detection target area set at the setting client 300 designates an area that will become the target of the image change detection process at the camera server 200.

The communication unit (receive) 310 further receives a change detection setting signal already set at the camera server 200. The change detection setting signal is sent to the change detection/tracking setting unit 340 and is applied to an initial value of a change detection/tracking setting. Note that as to a protocol with which the setting client 300 obtains the change detection signal and the change detection setting signal from the camera server 200, there are a method with which the protocol is implemented on Transmission Control Protocol (TCP), a method with which the protocol is implemented on HTTP, and the like.

The setting operation unit 350 is a unit for making a setting concerning the image change detection function and the tracking function of the camera server 200 and, more specifically, designates the change detection target area and designates the detection sensitivity on the display screen of the image display unit 330, for instance. When input of a setting parameter by the setting operation unit 350 is detected, the parameter inputted into the change detection/tracking setting unit 340 is sent to the communication unit (send) 360.

Then, the communication unit (send) 360 sends the set parameter to the camera server 200.

Next, a window displayed on the display screen of the image display unit 330 of the setting client 300 will be described with reference to FIGS. 2 and 3.

Figure 2:
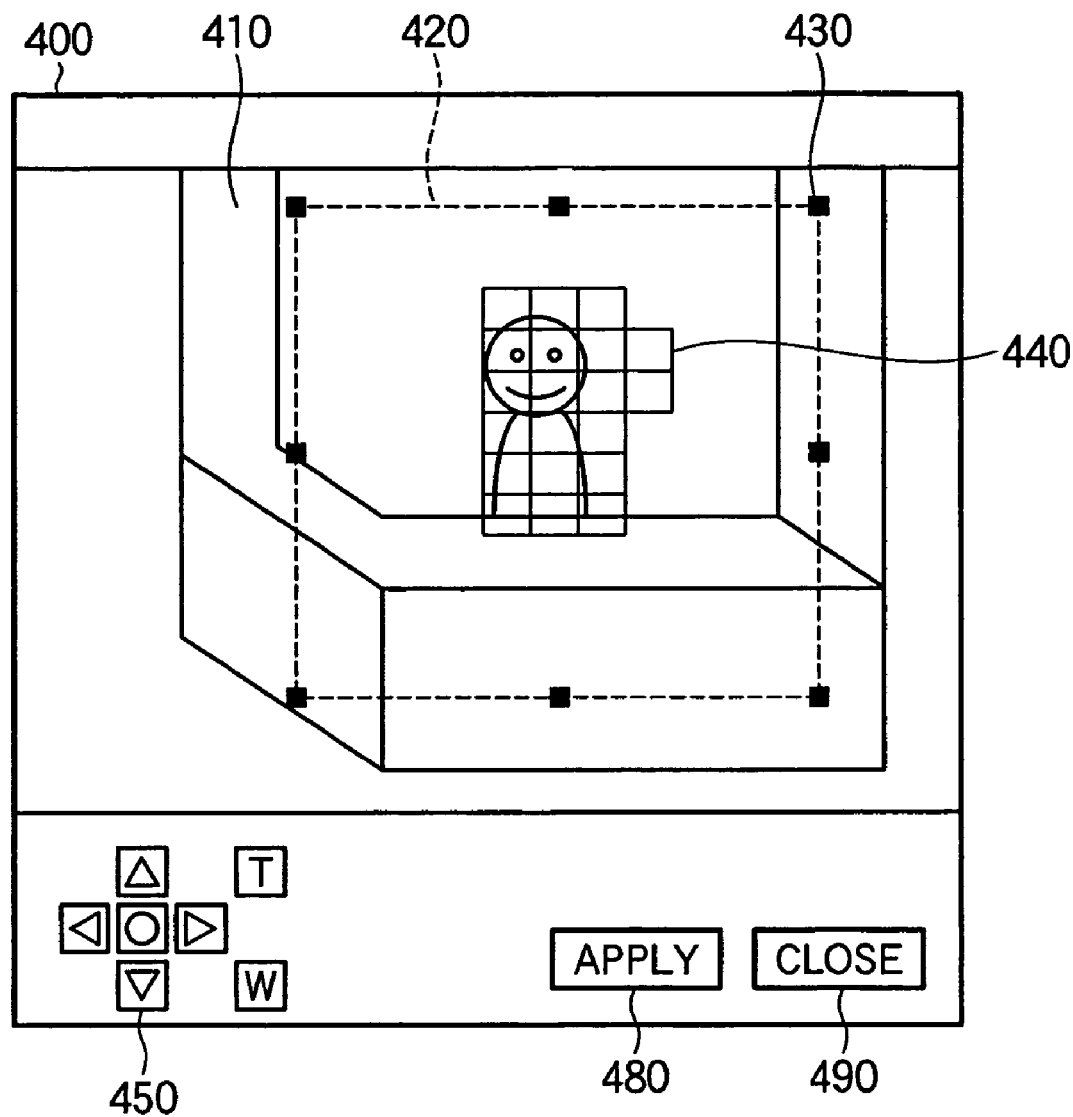
FIG. 2 shows an example of displaying by an image display unit at the setting client.

In FIG. 2, an image display window 400 is a window displayed through execution of application software at the setting client. The image display window 400 has an image display area 410 where an image received from the camera server 200 is displayed and a frame 420 is also displayed which indicates a change detection target area for extracting image data to be used for the change detection process in the image display area 410. By dragging latches 430 of the frame 420 with a mouse cursor (not shown), it is possible to change the size of the frame 420. Also, a position of the frame can be changed by dragging the mouse cursor (not shown) on the frame 420.

Further, a change occurrence block 440 indicating an area, in which a change of an image that the setting client 300 has received from the camera server has been detected, is displayed in the image display area 410 on the image display window 400. Note that in this embodiment, the image change detection is performed in units of blocks stipulated under the JPEG standard as described above, so the block displaying is performed, although when the change detection is performed in units of pixels, there occurs no problem even when the presence or absence of a change is displayed for each pixel.

A camera control button group 450, an apply button 480 for sending a set change detection target area to the camera server 200, and a button 490 for closing the image display window 400 are disposed in the lower portion of the image display window 400.

Figure 3:
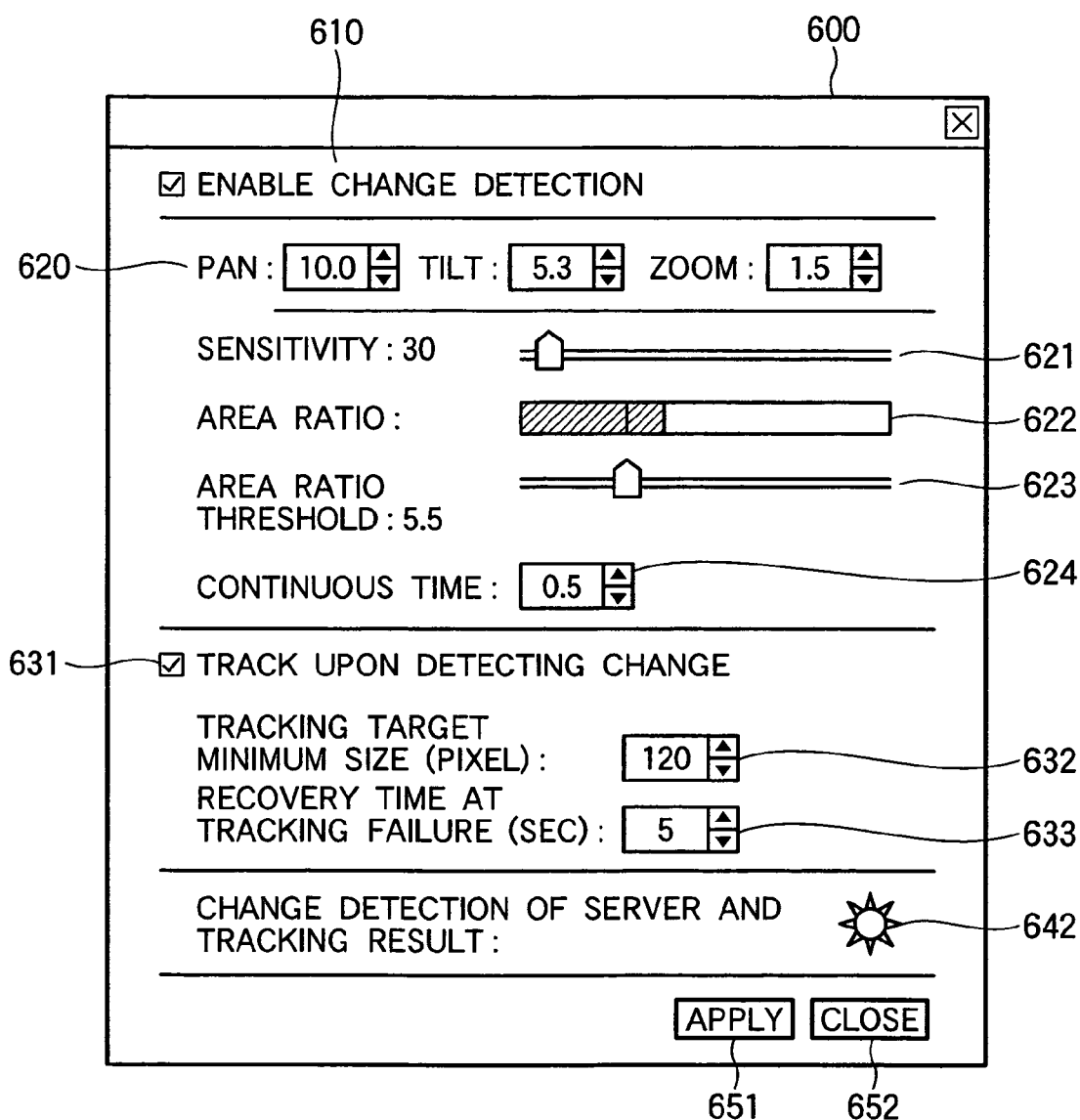
FIG. 3 shows an example of displaying by a setting operation unit for making various settings concerning an image change detection function and a tracking function of the camera server at the setting client.

FIG. 3 shows an example of a setting operation window displayed at the setting client 300 for performing various settings concerning the image change detection function and the tracking function of the camera server 200. Input through the setting window is performed using the setting operation unit 350 such as a keyboard and a mouse.

In FIG. 3, a window 600 is displayed through execution of application software. The window 600 is composed of a check box 610 for enabling/disabling the image change detection function, change detection function setting portions 620 to 624, tracking function setting portions 631 to 634, an icon 642 for displaying an image change detection result or a tracking state of the camera server, an apply button 651 for sending setting contents to the camera server, and a button 652 for closing the window 600.

The change detection function setting portion is composed of edit boxes with up and down arrows 620 for designating the pan/tilt/zoom position at the time when the image change detection is performed at the camera server 200, a sensitivity setting portion 621, an area ratio display portion 622, an area ratio setting portion 623, and a continuous time setting portion 624. The sensitivity, the area ratio, and the continuous time illustrated in FIG. 3 are each a threshold relating to the image change detection, with values of the sensitivity and the area ratio being each set using a slider and a value of the continuous time being set using an edit box with up and down arrows.

The area ratio display portion 622 is a portion where the area ratio, that is, the ratio of an area, in which a change has been actually detected, to the change detection target area is displayed in real time in the form of a graph that changes in a horizontal direction and it is possible to check whether the area ratio has exceeded a threshold at a glance.

The tracking setting portion is composed of a check box 631 for designating whether tracking of a target is to be performed when an image change detection event has occurred, an edit box with up and down arrows 632 for setting the minimum size of the tracking target, an edit box with up and down arrows 633 for setting a recovery time for returning to the image change detection state at tracking failure, and a tracking method change button 634 for making a detailed setting concerning the tracking. Settings made with the detail button will be described later.

When settings are made by an operator through operations of the buttons and the sliders on the window 600 and the like and the apply button 651 is pressed down, setting values are sent to the camera server 200 via the communication unit (send) 360 of the setting client.

The progress and result of the image change detection process/tracking process sent from the camera server 200 to the setting client 300 are displayed as the icon 642 on the window 600. When the check box 631 for designating whether the tracking of a target is to be performed upon image change detection event occurrence is not clicked in, the icon 642 indicates a state where the image change detection is set ON. On the other hand, when the check box 631 is clicked in, the icon 642 indicates a state where the tracking function is set ON.

Next, operations of the camera server 200 and the setting client 300 of the monitoring system in this embodiment will be described in detail with reference to FIGS. 4 to 10. Note that the camera server and the setting client each execute the following process by executing a control program using a CPU.

The camera server 200 executes a main process and a sub-process, with the image obtainment and the image change detection process/tracking process being performed in the sub-process. The main process will be first described and the sub-process will be next described.

Figure 4:
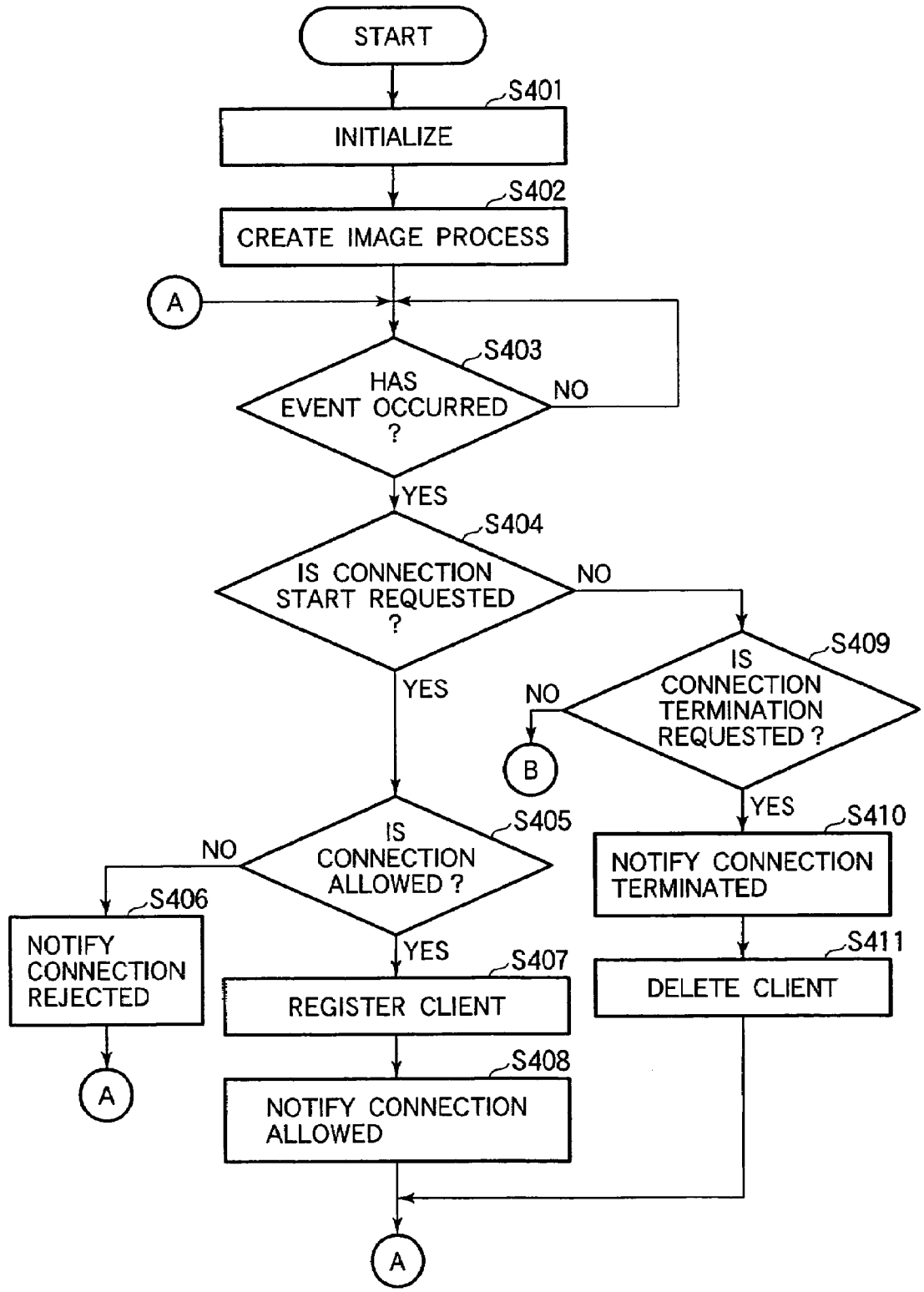
FIG. 4 is a flowchart showing a process procedure of a main process of the camera server.
Figure 5:
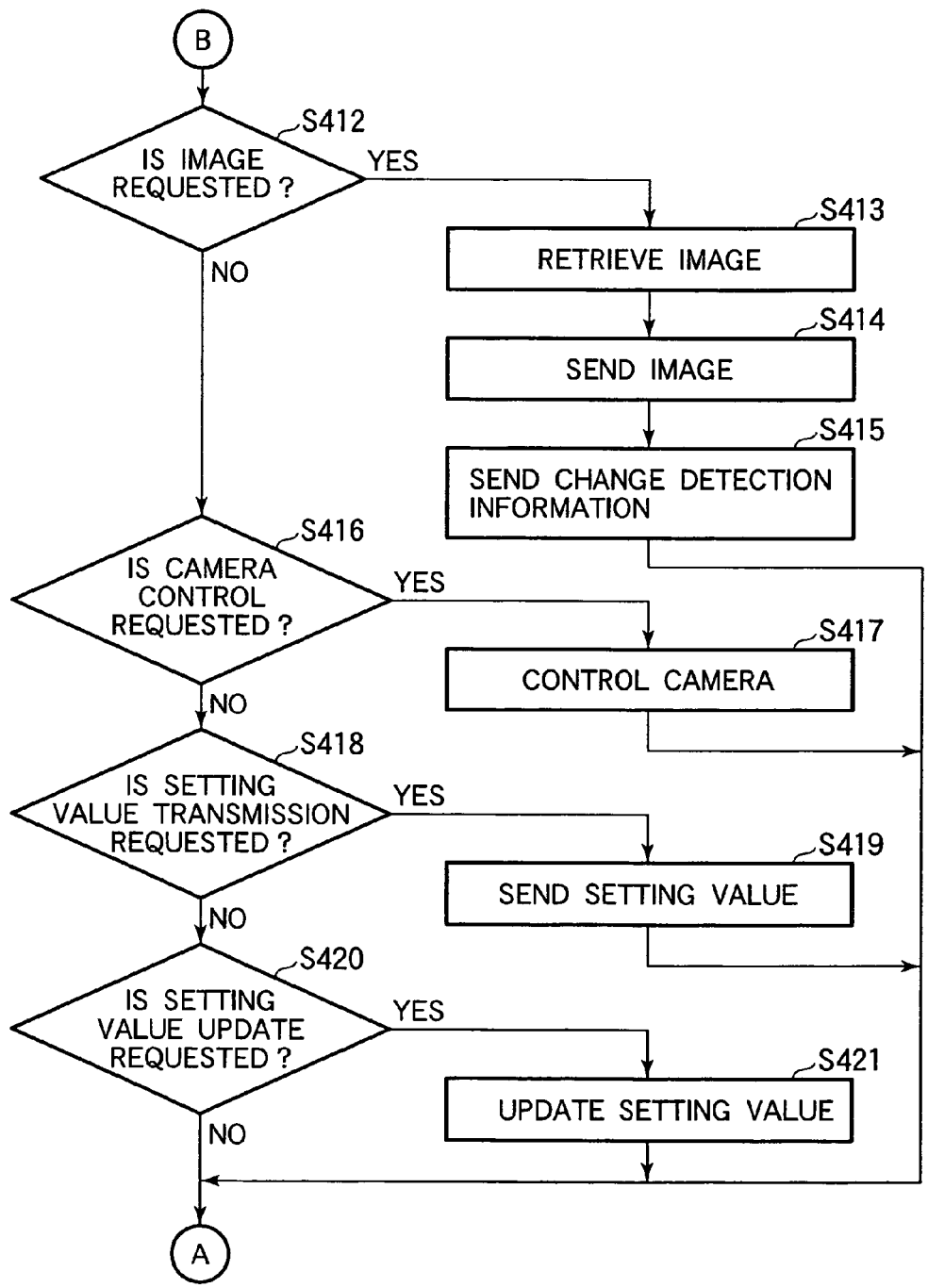
FIG. 5 is a flowchart continuing from the flowchart in FIG. 4.

FIGS. 4 and 5 are each a flowchart showing a process procedure of the main process of the camera server 200.

In FIGS. 4 and 5, after starting process of the main process, the CPU of the camera server 200 performs initialization process in step S401 and starts the sub-process (see FIGS. 6 and 7) in step S402. Next, in step S403, the CPU of the camera server performs event waiting. Following this, when an event has occurred, the process proceeds to step S404.

In step S404, the CPU of the camera server 200 judges whether the occurred event is a connection start request event. Following this, when it has been judged in step S404 that the occurred event is a connection start request event, the process proceeds to step S405 in which the CPU of the camera server 200 judges whether connection is allowed.

When it has been judged in step S405 that the connection is allowed, the process proceeds to step S406 in which the CPU of the camera server 200 issues a connection rejection notification to the setting client 300. On the other hand, when it has been judged in step S405 that the connection is allowed, the process proceeds to step S407 in which the CPU of the camera server 200 registers the client 300 for which connection has been allowed. More specifically, the CPU of the camera server 200 assigns a management number to the client 300, registers an IP address, and initializes management data such as a connection time.

Next, in step S408, the CPU of the camera server 200 issues a connection allowance notification to the setting client 300. Concurrently with the issuance of the connection allowance notification, the CPU of the camera server 200 also notifies the setting client 300 of the management number assigned to the client 300 and the like. Following this, the process returns to step S403 and the CPU of the camera server 200 waits for the next event.

When it has been judged in step S404 that the occurred event is not a connection request event, the process proceeds to step S409 in which the CPU of the camera server 200 judges whether the occurred event is a connection termination request event. When it has been judged in step S409 that the occurred event is a connection termination request event, the process proceeds to step S410 in which the CPU of the camera server 200 notifies the setting client 300 of connection termination.

Next, the process proceeds to step S411 in which the CPU of the camera server 200 deletes management data of the setting client 300 from a storage medium. Following this, the process returns to step S403 and the CPU of the camera server 200 waits for the next event.

When it has been judged in step S409 that the occurred event is not a connection termination request event, the process proceeds to step S412 in which the CPU of the camera server 200 judges whether the occurred event is an image request event. When it has been judged in step S412 that the occurred event is an image request event, the process proceeds to step S413 in which the CPU of the camera server 200 retrieves an image from the camera. Then, the process proceeds to step S414 in which the CPU of the camera server 200 sends the image to the client issued the request. Next, the process proceeds to step S415 in which the CPU of the camera server 200 sends change detection information (result of image change detection process/tracking process) to the client 300. Following this, the process returns to step S403 and the CPU of the camera server 200 waits for the next event.

When it has been judged in step S412 that the occurred event is not an image request event, the process proceeds to step S416 in which the CPU of the camera server 200 judges whether the occurred event is a camera control request event. When it has been judged in step S416 that the occurred event is a camera control request event, the process proceeds to step S417 in which the CPU of the camera server 200 performs camera control. After the camera control is completed, the process returns to step S403 and the CPU of the camera server 200 waits for the next event.

When it has been judged in step S416 that the occurred event is not a camera control request event, the process proceeds to step S418 in which the CPU of the camera server 200 judges whether the occurred event is a change detection/tracking setting value transmission request event. When it has been judged in step S418 that the occurred event is a change detection/tracking setting value transmission request event, the process proceeds to step S419 in which the CPU of the camera server 200 sends change detection/tracking setting values to the setting client 300. Following this, the process returns to S403 and the CPU of the camera server 200 waits for the next event.

When it has been judged in step S418 that the occurred event is not a change detection/tracking information request event, the process proceeds to step S420 in which the CPU of the camera server 200 judges whether the occurred event is a setting value update request event. The setting value update request event occurs when setting values are received from the setting client 300. When it has been judged in step S420 that the occurred event is a setting value update request event, the process proceeds to step S421 in which the CPU of the camera server 200 updates setting values. Following this, the process returns to step S403 and the CPU of the camera server 200 waits for the next event. When it has been judged in step S420 that the occurred event is not a setting value update request event, the process returns to step S403 and the CPU of the camera server 200 waits for the next event.

Figure 6:
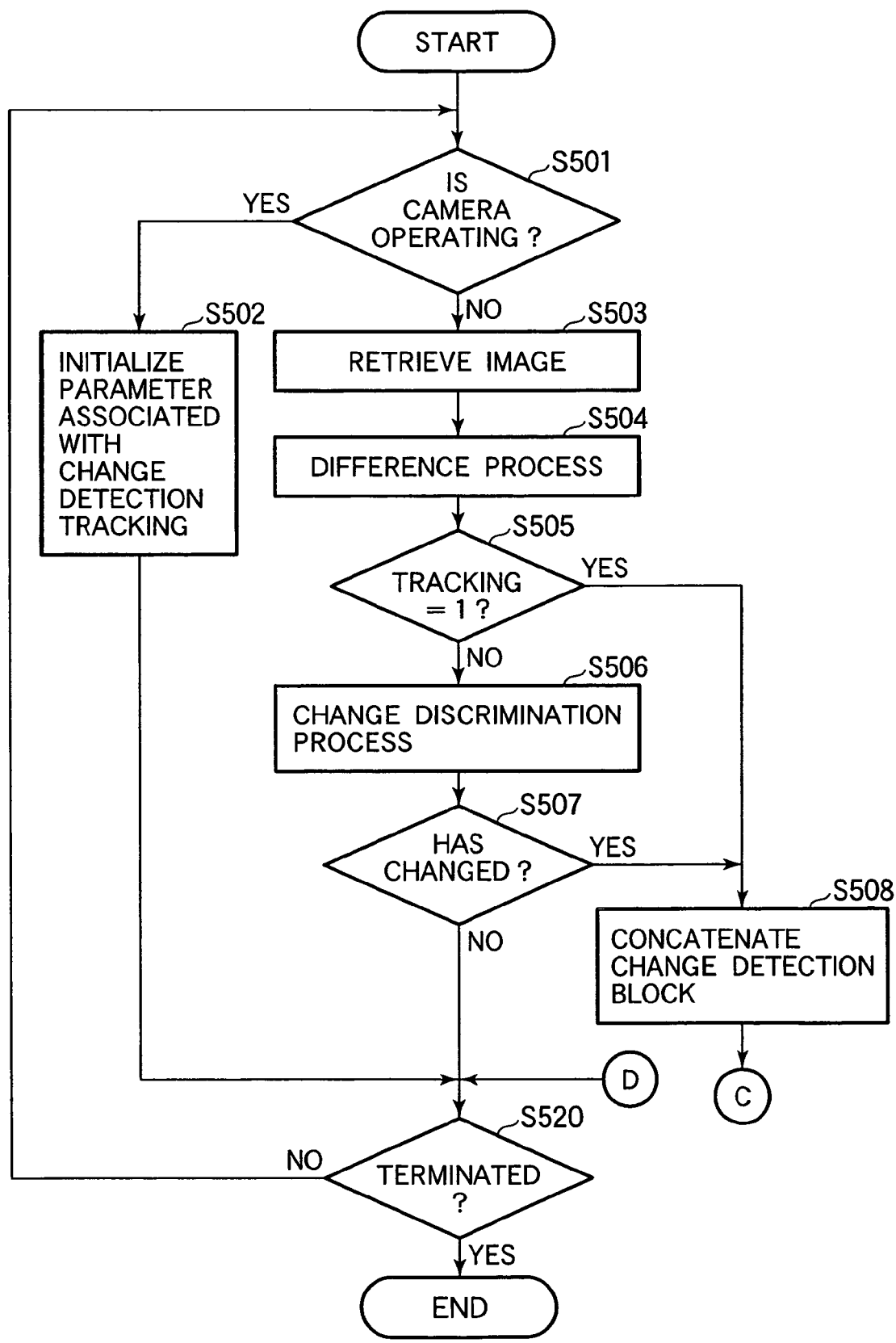
FIG. 6 is a flowchart showing a process procedure of a sub-process of the camera server.
Figure 7:
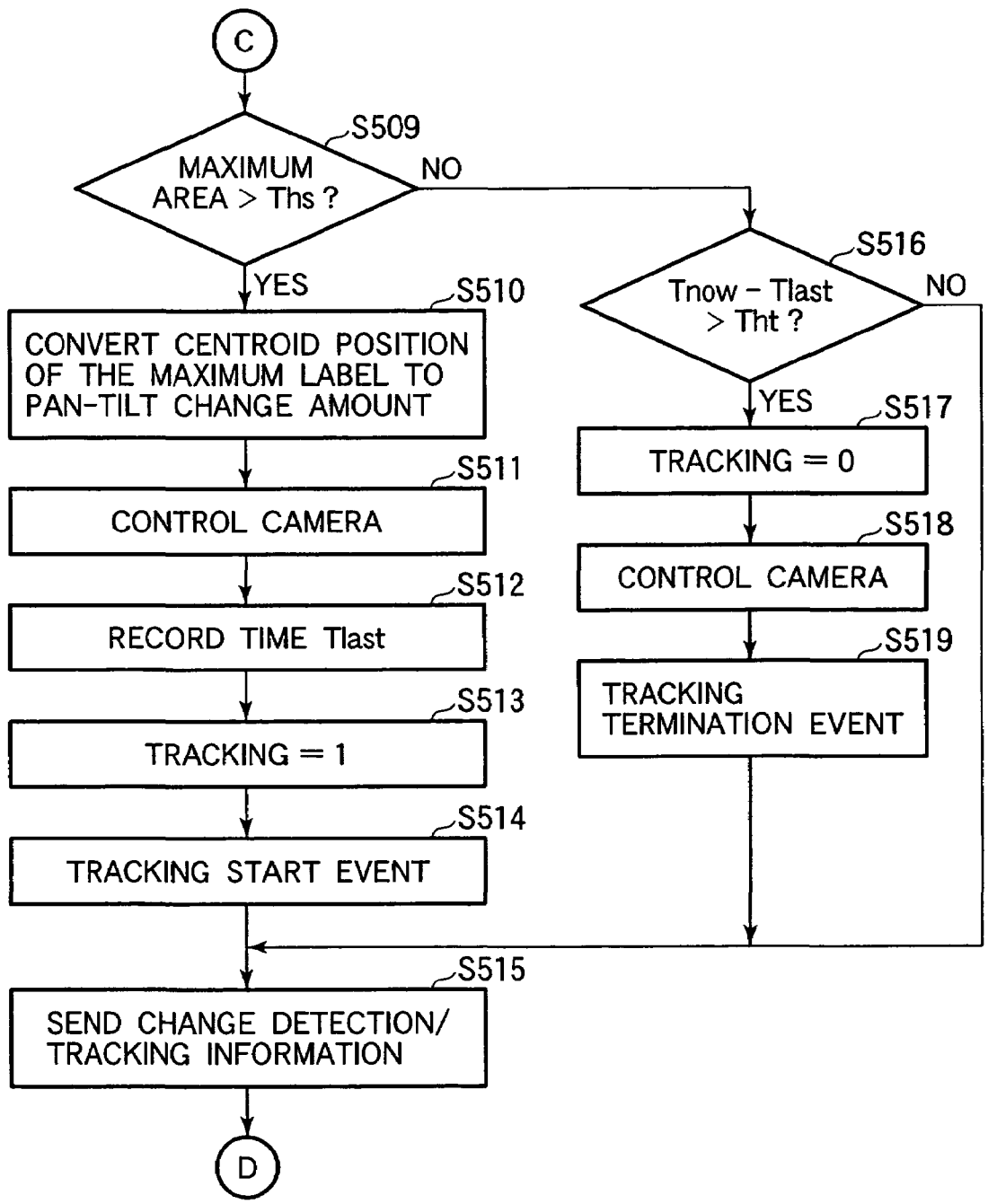
FIG. 7 is a flowchart continuing from the flowchart in FIG. 6.

FIGS. 6 and 7 are each a flowchart showing a process procedure of the sub-process executed by the CPU of the camera server 200.

In the sub-process, an image process for the image change detection and the tracking is performed. Note that in the following description, a case will be explained in which the check box 631 "track upon detecting change" on the window 600 is clicked in at the setting client and the tracking process is set ON.

In FIGS. 6 and 7, after starting a process of the sub-process, the CPU of the camera server 200 checks the operation state of the camera 100 in step S501. Following this, when it has been checked that the camera 100 is operating, the process proceeds to step S502 in which parameters associated with the image change detection process and the tracking process are initialized. Then, in step S520, the CPU of the camera server 200 judges whether a termination designation has been issued. Following this, when it has been judged in step S520 that a termination designation has been issued, the process is terminated. On the other hand, when it has been judged in step S520 that a termination designation has not been issued, the process returns to step S501.

When it has been judged in step S501 that the camera 100 is stopped, the process proceeds to step S503 in which the CPU of the camera server 200 retrieves an image picked up by the camera 100 and performs a process with respect to the retrieved image. Then, the process proceeds to step S504 in which the CPU of the camera server 200 performs an inter-adjacent-frame difference process on the retrieved picked-up image. As already described, the difference process is a process where the presence or absence of a change in each block of a JPEG image is judged. More specifically, the difference process is a process where difference sums of JPEG DCT coefficients are obtained in units of blocks and when the difference sums are greater than a threshold determined by the sensitivity, it is judged that movements of an image exist in corresponding blocks.

Next, the process proceeds to step S505 in which the CPU of the camera server 200 judges whether the current operation state is the tracking state. As described above, as the operation state of the CPU of the camera server 200, there are two states that are the image change detection state and the tracking state. The operation state is initially set at the image change detection state and when an image change is detected, the operation state shifts to the tracking state.

When it has been judged in step S505 that the current operation state is the tracking state, the process proceeds to step S508. On the other hand, when it has been judged in step S505 that the current operation state is not the tracking state, the process proceeds to step S506 in which the CPU of the camera server 200 performs change discrimination process. A procedure of the change discrimination process will be described later with reference to FIG. 8.

Next, the process proceeds to step S507 in which the CPU of the camera server 200 refers to an image change detection state. When the CPU of the camera server 200 has detected no image change in step S507, the process proceeds to step S520.

On the other hand, when the CPU of the camera server 200 has detected any image change in step S507, the process proceeds to step S508.

In step S508, the CPU of the camera server 200 performs a process for concatenating change detection blocks. The change detection block concatenation process is a process where when blocks, in each of which any change has been detected as a result of the difference process, are adjacent to each other, the blocks are concatenated into one area.

In step S509, the CPU of the camera server 200 judges whether an area, out of areas after the concatenation in step S508, which has the maximum area exceeds a predetermined threshold Ths. When it has been judged in step S509 that the area having the maximum area exceeds the predetermined threshold Ths, the process proceeds to step S510 and the CPU of the camera server 200 enters into tracking process.

In step S510, the CPU of the camera server 200 converts a difference between the centroid position of the maximum area label (block) and an image center into a pan-tilt control amount. Next, in step S511, the CPU of the camera server 200 performs camera control using the obtained pan-tilt control amount (camera control amount). Then, the CPU of the camera server 200 records a time, at which the camera control is started, in step S512 and changes a tracking state record flag to "1" indicating the tracking state in step S513.

Next, in step S514, the CPU of the camera server 200 issues a tracking start event (tracking start signal) to the client 300. Then, in step S515, the CPU of the camera server 200 sends information concerning the image change detection process and the tracking process to the setting client 300. The information concerning the image change detection process and the tracking process contains information showing the position of each block in which a change has occurred, the area ratio, the maximum area in which a change has been detected, the centroid position of the maximum area, and the tracking state. When the transmission is completed, the process proceeds to step S520.

When it has been judged in step S509 that the area having the maximum area is equal to or less than the predetermined threshold Ths, the process proceeds to step S516 in which the CPU of the camera server 200 checks an elapsed time from the start of the tracking. This operation is performed in order to precisely judge whether a tracking target candidate detected as a result of the change detection process is nose or not.

In step S516, the CPU of the camera server 200 obtains an elapsed time (Tnow−Tlast) from a time of the last camera control and judges whether the elapsed time exceeds a predetermined time Tht. When the elapsed time is equal to or less than the predetermined time Tht, operations in steps S517 to 519 are not performed. This is because there is a case where track of a target is lost temporarily in the tracking state and therefore it is required to continue the tracking state mode when the elapsed time is equal to or less than the predetermined time Tht.

When it has been judged in step S516 that the elapsed time exceeds the predetermined time Tht, the process proceeds to step S517 in which the CPU of the camera server 200 changes the tracking state record flag to "0" indicating the image change detection state. Then, the process proceeds to step S518 in which the CPU of the camera server 200 controls the camera so as to be set to a camera preset value for the image change detection. Finally, the process proceeds to step S519 in which the CPU of the camera server 200 issues a tracking termination event (tracking termination signal) to the setting client 300. Then, the process proceeds to step S515.

Figure 8:
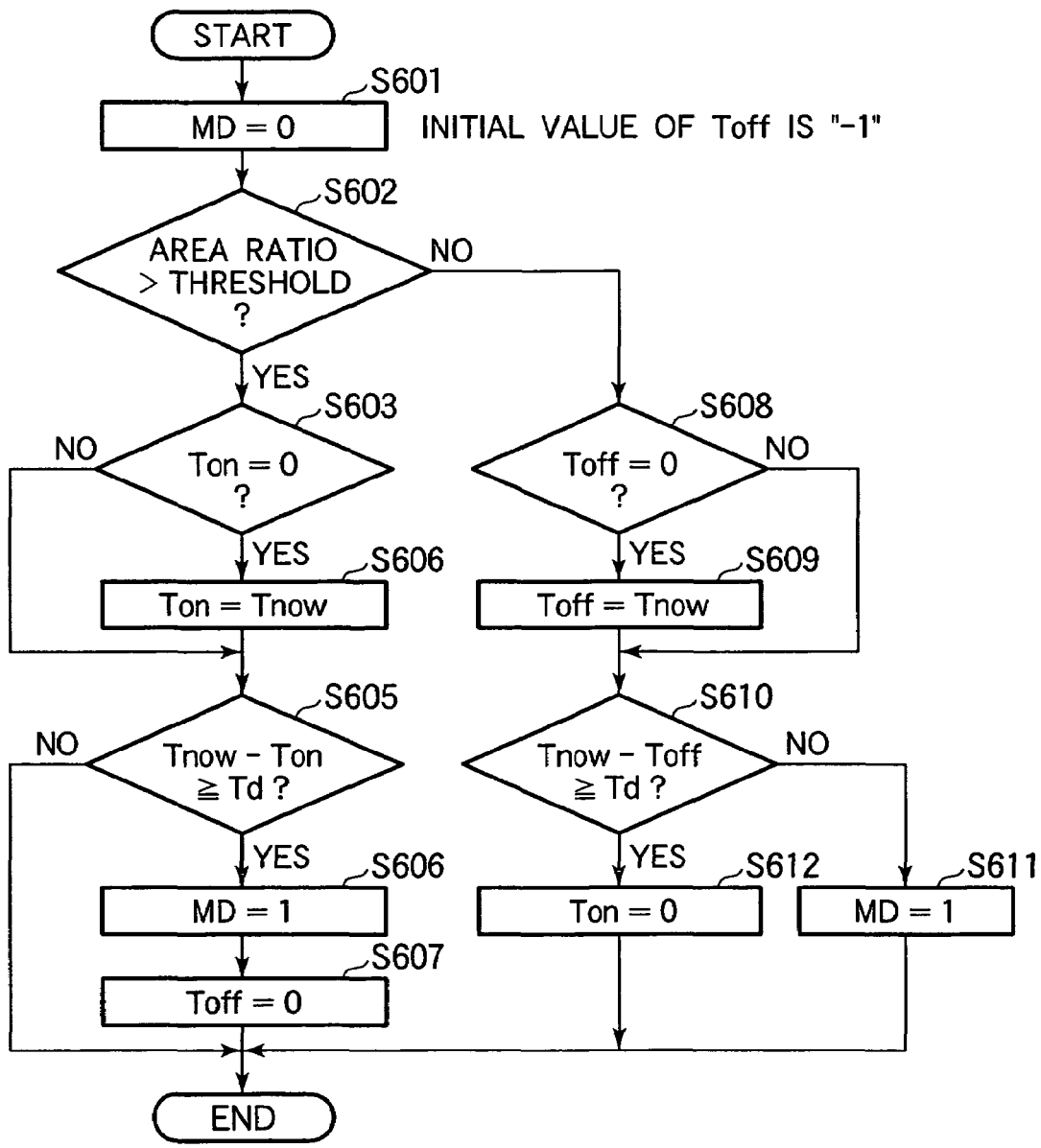
FIG. 8 is a flowchart showing a process procedure of image change detection discrimination by the camera server.

FIG. 8 is a flowchart showing a process procedure of image change detection discrimination by the camera server 200.

In FIG. 8, after starting a process, the CPU of the camera server 200 performs initialization "MD=0" in step S601. Here, "MD" represents the final result of the image change detection. When "MD=0", this indicates that no image change has been detected. On the other hand, when "MD=1", this indicates that an image change has been detected. Next, in step S602, the CPU of the camera server 200 judges whether the area ratio (change amount) exceeds a threshold. As described above, the area ratio is a ratio of the total area of blocks, in each of which a change has actually occurred, to the change detection target area.

When it has been judged in step S602 that the area ratio (change amount) exceeds the threshold, the process proceeds to step S603 in which the CPU of the camera server 200 makes a judgment "Ton=0". Here, "Ton" is a time (ON start time) at which the area ratio has exceeded the threshold. Also, "Toff" to be described later is a time (OFF start time) at which the area ratio has become equal to or less than the threshold. The initial value of "Ton" is "0" and the initial value of "Toff" is "−1".

When it has been judged in step S603 that "Ton=0", that is, the current state is an initialized state, the process proceeds to step S604 in which the CPU of the camera server 200 makes a setting "Ton=Tnow". Then, the process proceeds to step S605. Here, "Tnow" is the current time. When it has been judged in step S603 that the ON start time has already been set, the process proceeds to step S605.

In step S605, the CPU of the camera server 200 judges whether "Tnow−Ton" is equal to or more than the continuous time Td. Following this, when it has been judged in step S605 that "Tnow−Ton" is equal to or more than the continuous time Td, the process proceeds to step S606 in which the flag "MD" is set so as to indicate that an image change has been detected (MD=1). When the flag is set, this indicates that the area ratio exceeds the threshold continuously for the continuous time or more or even when the area ratio becomes equal to or less than the threshold for a moment, the CPU of the camera server 200 has judged that a change has been detected because the state where the area ratio is equal to or less than the threshold does not continue for the continuous time or more. Then, in step S607, initialization of the OFF start time "Toff=0" is performed and then the process is ended. When it has been judged in step S605 that "Tnow−Ton" is less than the continuous time Td, the process is ended.

When it has been judged in step S602 that the area ratio (change amount) is equal to or less than the threshold, the process proceeds to step S608 in which the CPU of the camera server 200 judges whether "Toff=0" or not. When it has been judged in step S608 that "Toff=0", the process proceeds to step S609 in which the CPU of the camera server 200 makes a setting "Toff=Tnow", that is, substitutes the current time into the OFF start time. Then, the process proceeds to step S610. On the other hand, when it has been judged in step S608 that "Toff" is not equal to "0", the process proceeds to step S610.

In step S610, the CPU of the camera server 200 judges whether "Tnow−Toff" is equal to or more than the continuous time Td. When it has been judged in step S610 that "Tnow−Toff" is equal to or more than the continuous time Td, the process proceeds to step S612 in which the CPU of the camera server 200 performs initialization "Ton=0". When "Ton" is initialized to "0", this indicates that the area ratio remains equal to or less than the threshold continuously or even when the area ratio exceeds the threshold for a moment, it has been judged that no change has been detected because the state where the area ratio exceeds the threshold does not continue for the continuous time or more. When it has been judged in step S610 that "Tnow−Toff" is less than the continuous time Td, the process proceeds to step S611 in which the CPU of the camera server 200 sets the flag "MD" so as to indicate that an image change has been detected (MD=1). When the flag is set at "1", this indicates that a time, during which the area ratio becomes equal to or less than the threshold, is short, so a state where a change has been detected continues.

Next, a process procedure of a process of the setting client 300 will be described with reference to FIGS. 9 and 10. The process of the setting client 300 is composed of a main process and a sub-process. The sub-process is a process where reception of an image from the camera server 200 and decoding of the image are performed and at a point in time when the decoding is completed, an event requesting displaying of the image is issued to the main process. Through separation from a process associated with a GUI, lowering of responsiveness of the GUI is prevented. In the following description, only the main process will be described.

Figure 9:
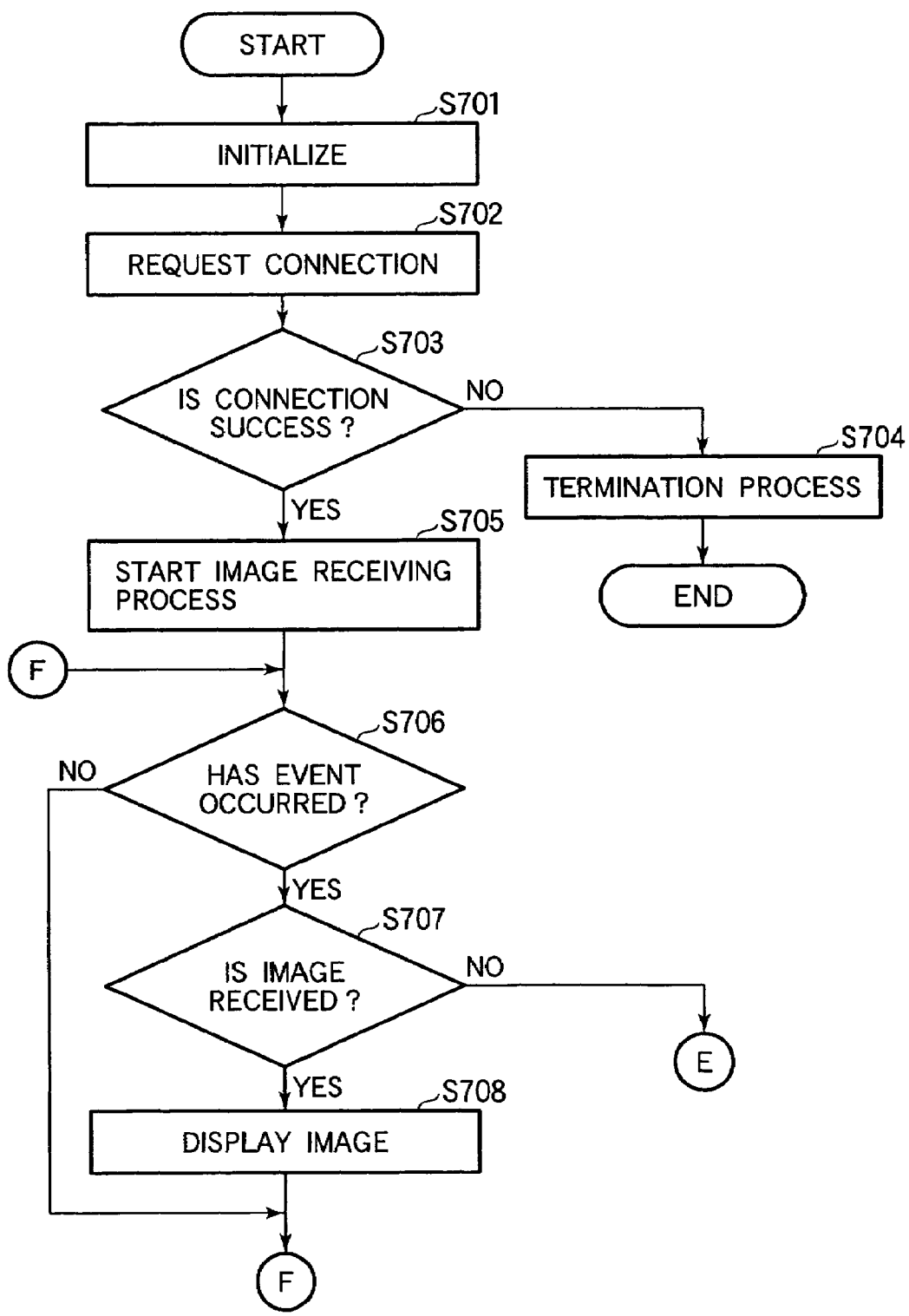
FIG. 9 is a flowchart showing a process procedure of a main process of the setting client.
Figure 10:
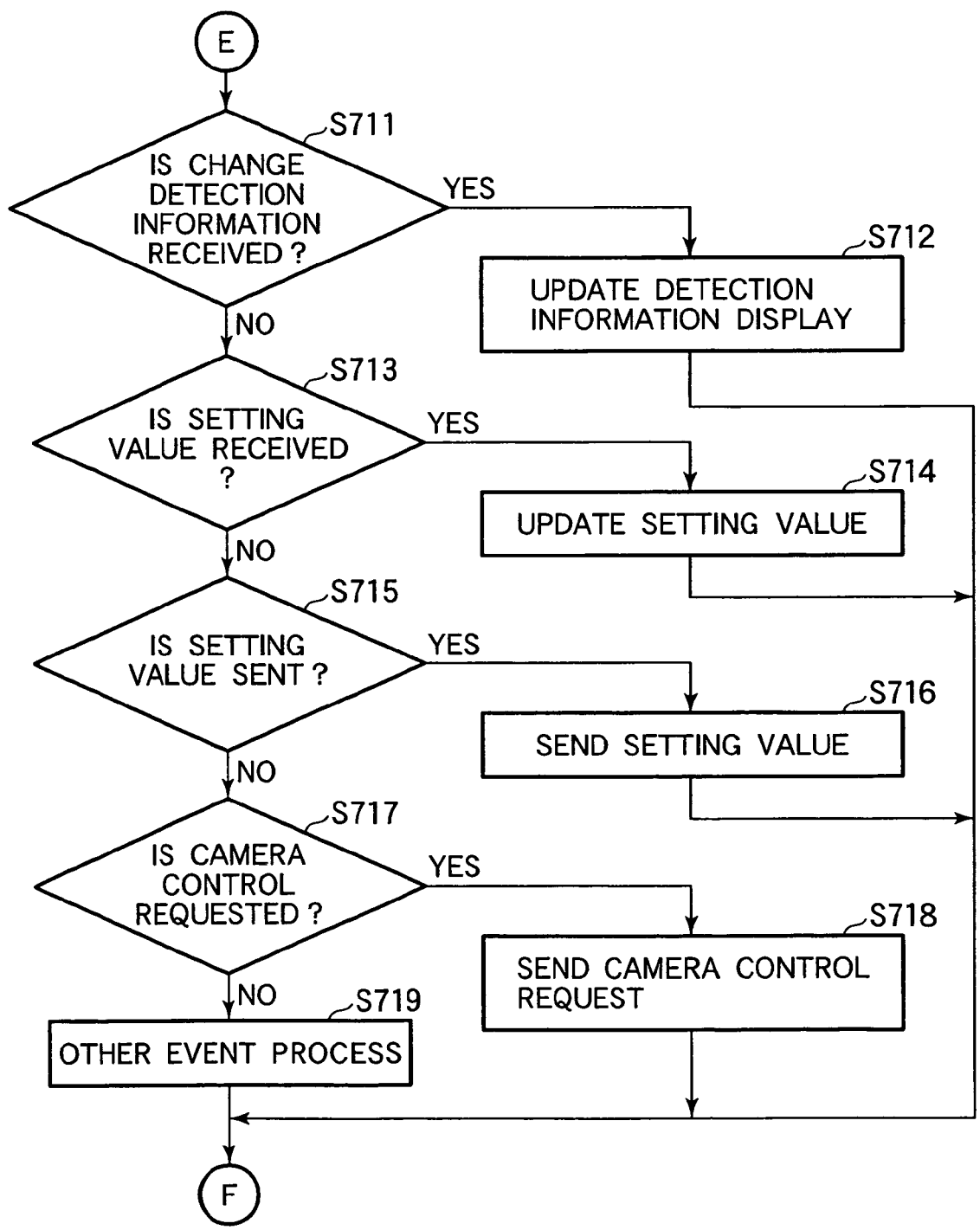
FIG. 10 is a flowchart continuing from the flowchart in FIG. 9.

FIGS. 9 and 10 are each a flowchart showing a process procedure of the main process executed by the CPU of the setting client 300.

In FIGS. 9 and 10, after starting the process, the CPU of the setting client 300 performs initialization in step S701 and issues a connection request to the camera server 200 in step S702. Next, in step S703, the CPU of the setting client 300 waits for a response from the camera server 200. When the connection has ended in failure, the process proceeds to step S704 in which the CPU of the setting client 300 performs termination process.

When the connection has ended in success, the process proceeds to step S705 in which the CPU of the setting client 300 starts the sub-process where reception of an image from the camera server 200 is performed. Then, the process proceeds to step S706 in which the CPU of the setting client 300 judges whether an event has occurred. When it has been judged in step S706 that an event has occurred, the process proceeds to step S707 in which the CPU of the setting client 300 judges whether the occurred event is an image reception event. When it has been judged in step S707 that the occurred event is an image reception event, the process proceeds to step S708 in which the CPU of the setting client 300 displays the received image on the image display unit 330. Following this, the process returns to step S706 and the CPU of the setting client 300 waits for the next event.

When it has been judged in step S707 that the occurred event is not an image reception event, the process proceeds to step S711 in which the CPU of the setting client 300 judges whether the occurred event is a change detection information reception event. When it has been judged in step S711 that the occurred event is a change detection information reception event, the process proceeds to step S712 in which the CPU of the setting client 300 updates displaying of information showing a result of the change detection. The information showing the change detection result is the change detection block position 440, the area ratio 622, and the change detection result/tracking state display (icon) 642.

When it has been judged in step S711 that the occurred event is not a change detection information reception event, the process proceeds to step S713 in which the CPU of the setting client 300 judges whether the occurred event is a setting value reception event. The setting value reception event is an event that occurs when setting values are reread. When it has been judged in step S713 that the occurred event is a setting value reception event, the process proceeds to step S714 in which the CPU of the setting client 300 updates displaying of setting values concerning the image change detection function and the tracking function of the camera server 200. Following this, the process returns to step S706 and the CPU of the setting client 300 waits for the next event.

When it has been judged in step S713 that the occurred event is not a setting value reception event, the process proceeds to step S715 in which the CPU of the setting client 300 judges whether the occurred event is a setting value transmission event. The setting value transmission event is an event that occurs when the apply button 480 on the image display window 400 is pressed down. When it has been judged in step S715 that the occurred event is a setting value transmission event, the process proceeds to step S716 in which the CPU of the setting client 300 sends setting values concerning the image change detection function and the tracking function to the camera server 200. Following this, the process returns to step S706 and the CPU of the setting client 300 waits for the next event.

When it has been judged in step S715 that the occurred event is not a setting value transmission event, the process proceeds to step S717 in which the CPU of the setting client 300 judges whether the occurred event is a camera control request event. The camera control request event is an event that occurs when the camera control button group (pan/tilt/zoom) 450 is pressed down.

When it has been judged in step S717 that the occurred event is a camera control request event, the process proceeds to step S718 in which the CPU of the setting client 300 sends a camera control request to the camera server 200. Following this, the process returns to step S706 and the CPU of the setting client 300 waits for the next event. When it has been judged in step S717 that the occurred event is not a camera control request event, the process proceeds to step S719 in which the CPU of the setting client 300 performs other event process. Following this, the process returns to step S706 and the CPU of the setting client 300 waits for the next event.

As described above, according to this embodiment, the camera server 200 performs retrieval of an image picked-up by the camera, the image change detection process, and the tracking process. In addition, the camera server 200 sends the image and the progress and result of the image change detection process/tracking process to the setting client 300 through the network. At the setting client 300, it is possible to make optimum settings concerning the image change detection function and the tracking function of the camera server 200 with ease while checking displaying of the image and information concerning the progress and result of the image change detection process/tracking process sent from the camera server 200.

Figure 11:
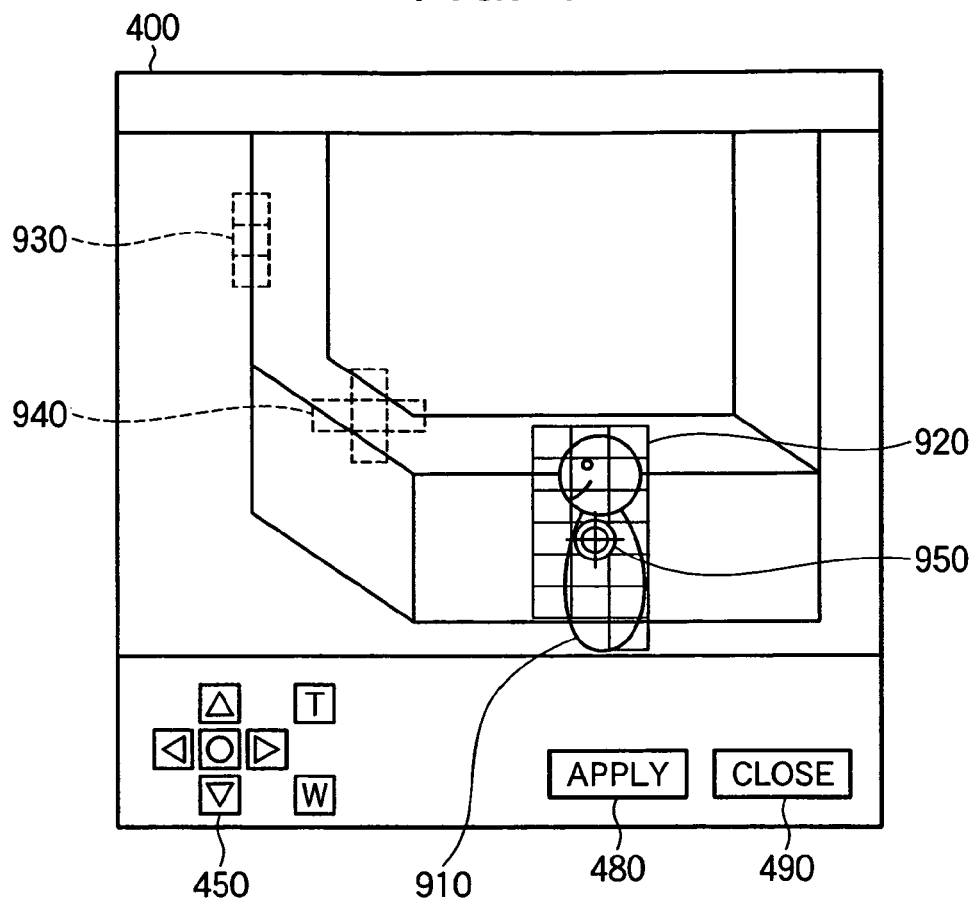
FIG. 11 shows an example of tracking process progress displaying by the image display unit of the setting client.

FIG. 11 shows an example of the tracking process progress displaying at the image display unit 330 of the setting client 300 according to this embodiment.

In FIG. 11, change detection blocks 920, 930, and 940 are displayed on the image display window 400 at the time of start of tracking. The change detection blocks 920, 930, and 940 are each a separated area where multiple blocks have been concatenated. The change detection block 920 that is the maximum area is displayed in a frame color that is different from those of the remaining change detection blocks 930 and 940. In addition, a target marker 950 is displayed at the centroid position of the change detection block 920 that is the maximum area.

In order to realize the display function, it is sufficient that in step S515 in FIG. 7, in addition to the change detection information, information showing a result of concatenation of blocks in each of which a change has been detected at the time of tracking of a change detection target, information showing the position of each block belonging to the maximum area, and information showing the centroid position of the maximum area are sent to the setting client as information concerning the tracking process.

More specifically, the JPEG blocks have a size of 8×8 pixels, so when the image size is 320×240 pixels, for instance, the block concatenation information becomes an array of 40×30 blocks where label numbers are written. Each block concatenated into the same block is assigned the same label number. The size of each element depends on the maximum value of the label number, although it is up to 2400, so two bytes are sufficient. Also, as to the maximum area information, it is sufficient that the label number of the maximum area is transmitted using two bytes and it is also sufficient that two bytes are used for each of the centroid position in the x direction and the centroid position in the y direction.

On the other hand, on a setting client 300 side, in the image change detection information reception step S711 shown in FIG. 10 described above of the main process of the setting client 300, the information concerning the tracking process described above is also obtained in addition to the change detection information. Following this, when the camera server 200 is in the image change detection state, the displaying shown in FIG. 2 is performed. On the other hand, when the camera server 200 is in the tracking state, the displaying shown in FIG. 11 is performed.

As described above, the setting client 300 visually displays the progress of the tracking process (result of concatenation of blocks where changes have been detected at the time of tracking of a change detection target, the position of each block belonging to the maximum area, and the centroid position of the maximum area) in addition to the change detection information (change detection block position, change detection area ratio, and change detection result) of the camera server 200, so it becomes possible for the user to make settings concerning the image change detection function and the tracking function of the camera server 200 more precisely.

Next, how the tracking method is changed at the setting client 300 will be described. When selection of the tracking method change button 634 of the window 600 shown in FIG. 3 is detected, a window 1000 shown in FIG. 12 for performing a detailed selection of the tracking method is displayed.

(Tracking by Color Detection)

Figure 12:
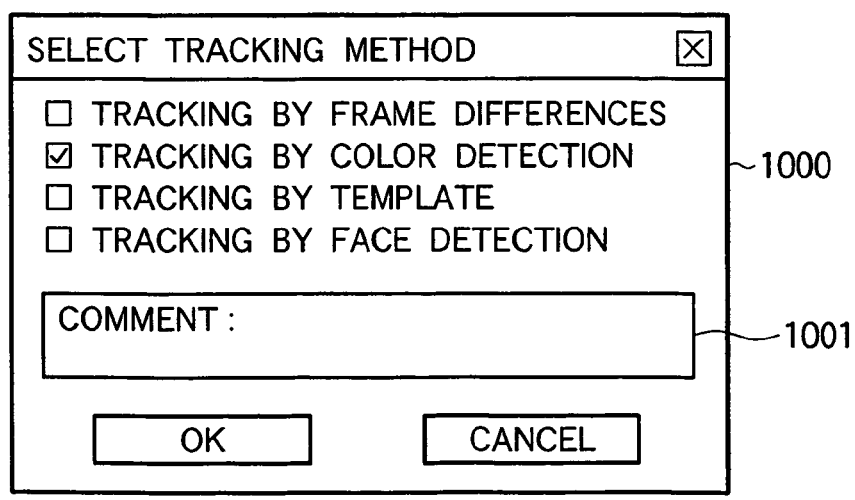
FIG. 12 shows an example of a window for making a selection of a tracking method.
Figure 13A:
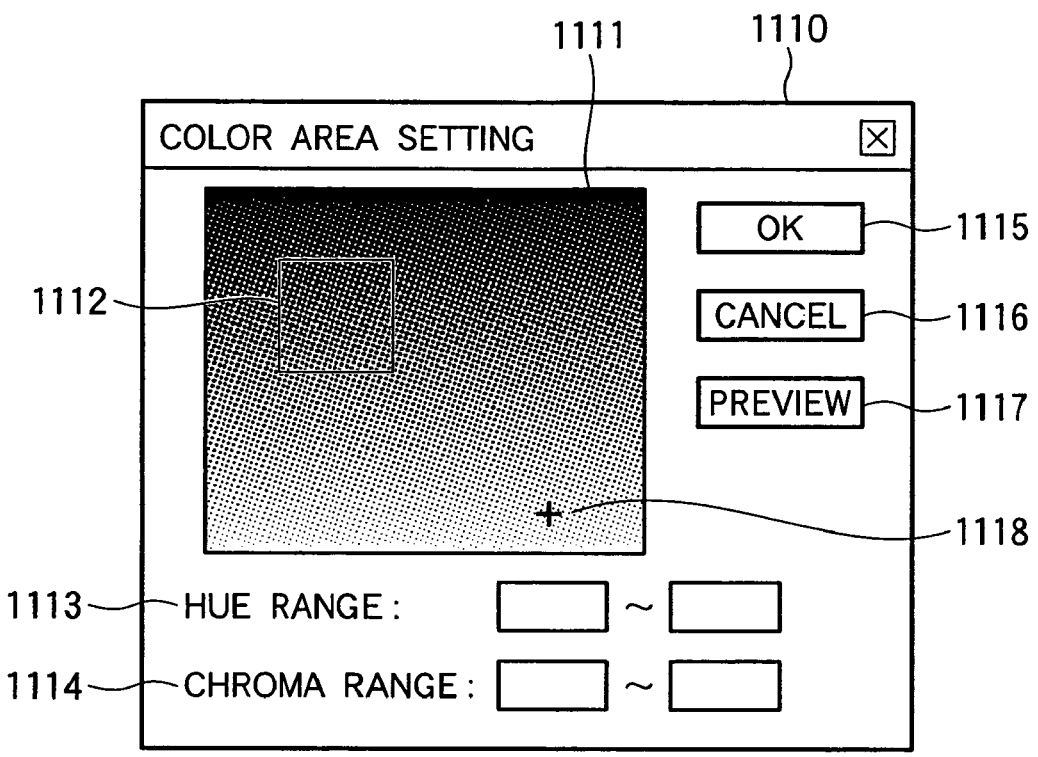
FIG. 13A shows an example of a setting screen concerning tracking process using color information.

When a situation is detected in which a check box "tracking by color detection" is clicked in and an "OK" button is selected on the window 1000 shown in FIG. 12, a window 1110 shown in FIG. 13A for a setting concerning the tracking by color detection is displayed. Here, a system will be described in which the target detection process at the time of tracking is performed using color information. The outline of the target detection system using the color information is as follows. First, a partial area is provided on a color space expressed in a specific color system and it is judged whether each pixel on an image belongs to the color space. Next, a concatenation process is performed on extracted pixels, thereby obtaining multiple areas. Finally, as the tracking process, camera control is performed so that the centroid point of the maximum area is positioned at the center of the screen.

Figure 13B:
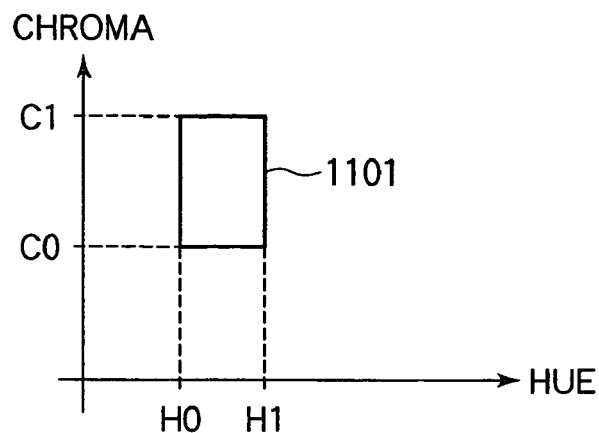
FIG. 13B is an explanatory diagram of a color area whose axes are set as hue and chroma.

An example of the color space will be described using FIG. 13B. The color space is defined by two dimensions that are hue and chroma and the partial area 1101 is set on the space by determining the range of each of the hue and the chroma. The chroma and the hue from RGB values of pixels can be obtained using a publicly known conversion expression.

Next, a method for setting a color area will be described with reference to FIGS. 13A and 13B. In FIG. 13A, a color space 1111, whose horizontal axis is set as the hue and vertical axis is set as the chroma, and a color area 1112 existing on the color space are displayed in the window 1110. The color area 1112 displayed in a rectangular shape indicates the ranges of the hue and chroma and the camera server 200 tracks an object having a color in the color area 1112. It is possible to set the color setting area 1112 not only through input of values into a hue range setting portion 1113 and a chroma range setting portion 1114 but also through direct dragging of the color area 1112 with a mouse cursor. When the setting of the color area is finished, the values are reflected through pressing down of an OK button 1115 or the process is terminated without reflecting the values through pressing down of a cancel button 1116.

In order to check the setting values while displaying the window 1110, a preview button 1117 is selected. Through the selection of the OK button 1115 or the preview button 1117, area information of the color area 1112 is sent to the camera server 200. The camera server 200 receives the information and reflects it in the tracking process. Note that an indicator 1118 indicates values of the chroma and the hue obtained through integration of images currently sent from the camera server 200. When the color area 1112 is set in the vicinity of the indicator 1118, that is, when the chroma and the hue of the object that is the tracking target are similar to those of a background, the accuracy of the tracking is lowered. In this embodiment, however, it is possible for the user to set the color area with reference to the indicator, so it becomes possible for him/her to make settings concerning the tracking with accuracy.

Also, as another method for inputting the color space, there is a method with which an area that is desired to be set as the detection target is directly designated on an image distributed from the camera server 200. With this method, for instance, in FIG. 2, a flesh color portion of a person is designated with a mouse cursor and the color area is determined based on the color distribution of peripheral pixels. A color designated during this operation is displayed as the color area 1112 of the window 1110 and it is possible for the user to check the color area 1112. Note that as a method for designating the area, it is also possible to set a group of points existing within a certain distance from a point designated with the mouse cursor as a target of totalization or to designate an area having an arbitrary shape, such as a rectangular area, on an image and set a group of points existing in the area as the totalization target. Even through such designation, a situation is obtained in which the maximum detection area and its centroid position shown in FIG. 11 are displayed, so it becomes possible for the user to grasp which area should be set as the tracking target area with ease.

It should be noted here that when the tracking process by color information is performed, color area information and on-screen area designation information are sent from the setting client 300 to the camera server 200 as setting information. More specifically, in the case of the area designation method shown in FIG. 13A, the minimum value of chroma becomes "C0", the maximum value of the chroma becomes "C1", the minimum value of the hue becomes "H0", and the maximum value of the hue becomes "H1". Also, when a point on the screen is designated, the pixel coordinate position of the point becomes (Ix, Iy).

On the other hand, when the tracking process by color information is performed, information sent from the camera server 200 to the setting client 300 in the case of the detection state is the same as that in the embodiment described above but color detection pixels and labels (or color detection blocks and labels), the maximum label number, the size of the maximum label area, and the centroid position of the color detection area are sent in the case of the tracking state. They are expressed as follows.

color detection pixels and labels: (Pxi, Pyi) and Lpi|i=1 ... M
color detection blocks and labels: (Bxj, Byj) and Lbj|j=1 ... N
maximum label number: Lpmax, Lbmax
maximum area label size: Spmax, Sbmax
color detection area centroid position: (Cpx, Cpy), (Cbx, Cby)

It should be noted here that in this embodiment, the chroma and the hue are used as the color space, although another color space that derives from another color system such as a CrCb space, a UV space, or an xy space can be used. Also, the area on the color space is not limited to the rectangular shape and it is possible to set an area having an arbitrary shape. Further, it is possible to totalize the color distribution in a group of points belonging to an arbitrary area designated on an image and set a result of the totalization as the color distribution of the tracking target.

Also, as another target detection method using color information, there is a method with which a color distribution containing a frequency is stored with respect to a collection of pixels belonging to a tracking target and the same color distribution area is extracted from a picked-up image, thereby detecting the position of the tracking target on the image. The extraction of the same color distribution area is performed by, for instance, obtaining color distributions in units of blocks composed of 8×8 pixels and performing matching. This is a matching method using a color histogram, which is a conventional technique.

Hereinafter, process procedures of the camera server 200 and the setting client 300 in the case where the tracking process by color information is set will be described.

Figure 14:
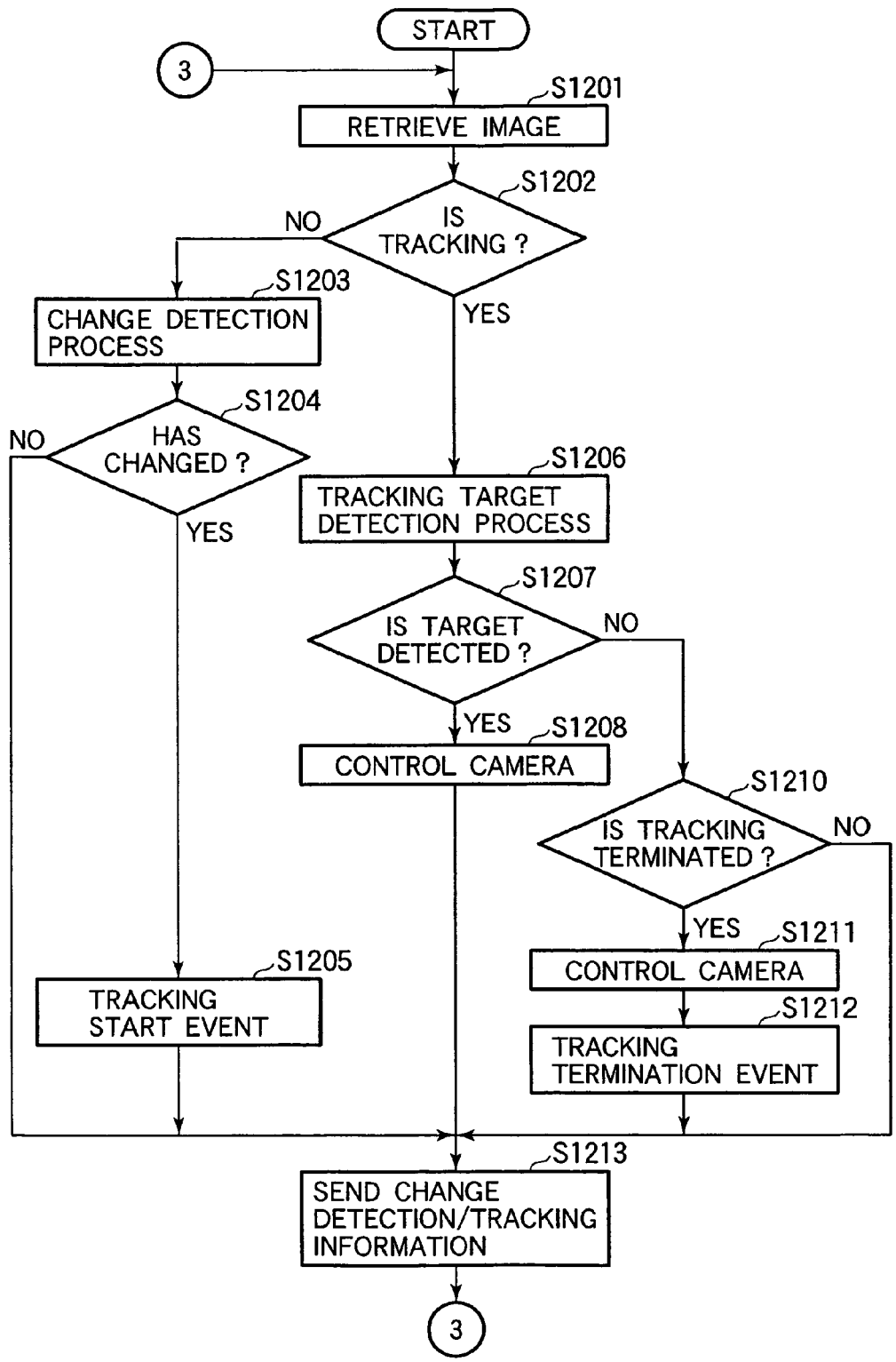
FIG. 14 is a flowchart showing a procedure of the tracking process using color information executed by the camera server.

A procedure of the sub-process executed by the CPU of the camera server 200 in order to perform the tracking process by color information will be describe with reference to FIG. 14. Note that the detailed process of the change detection is the same as that shown in FIG. 6, so the description thereof will be omitted. Note that it is assumed that prior to the sub-process shown in FIG. 14, exchange of color area information and the like are completed between the camera server 200 and the setting client 300.

In FIG. 14, the CPU of the camera server 200 retrieves a picked-up image from the camera 100 in step S1201 and judges whether the camera is tracking in step S1202. When the camera is not tracking, the process proceeds to S1203 in which the CPU of the camera server 200 performs a change detection process based on settings made by the sensitivity setting unit 621, the area ratio display unit 622, the area ratio setting unit 623, and the continuous time setting unit 624 of the setting client 300. Next, in step S1204, the CPU of the camera server 200 judged whether a change exists with reference to a result of the change detection. When it has been judged in step S1204 that no change exists, the process proceeds to step S1213. On the other hand, when it has been judged in step S1204 that a change exists, the process proceeds to step S1205 in which the CPU of the camera server 200 issues a tracking start event. Then, the process proceeds to step S1213. In this step, the operation state shifts from the change detection state to the tracking state. In step S1213, in addition to the change detection information, the CPU of the camera server 200 sends color detection pixels and labels (or color detection blocks and labels), the maximum label area color-detected, the size of the maximum label area, and the centroid position of the maximum area label to the client as tracking information. Then, the process returns to step S1201.

It should be noted here that on a setting client 300 side, the maximum label area color-detected is displayed so as to be superimposed on such an image as shown in FIG. 11, where the maximum change detection area is displayed, so it become still easy for the user to make a setting of the tracking function of the camera 100.

When it has been judged in step S1202 that the camera 100 is tracking, the process proceeds to step S1206 in which the CPU of the camera server 200 performs a tracking target detection process using the color information described above. Next, in step S1207, the CPU of the camera server 200 judges whether the target has been detected. This judgment is made by performing a labeling process through concatenation of detected color areas and judging whether the maximum area is equal to or more than a certain value. When it has been judged that the maximum area is equal to or more than the certain value, the process proceeds to step S1208 in which the CPU of the camera server 200 controls the pan, tilt, and zoom of the camera 100 so as to track the detected color area. Then, the process proceeds to step S1213.

When it has been judged in step S1207 that no tracking target has been detected, the process proceeds to step S1210 in which the CPU of the camera server 200 judges whether the tracking is to be terminated. This judgment is made by judging whether a target undetectable state has continued for a certain time. When it has been judged in step S1210 that the tracking is to be terminated, the processing proceeds to step S1211 in which the CPU of the camera server 200 returns the camera 100 to a predetermined target detection state. At this point in time, the operation state shifts from the tracking state to the change detection state. Then, a tracking termination event is issued in step S1212 and is sent to the client in step S1213. When it has been judged in step S1210 that the tracking is to be continued, the process proceeds to step S1213 and the change detection process is continued.

(Tracking by Template)

Next, a process in the case where "tracking by template" is selected in the window 1000 shown in FIG. 12 will be described. Template matching is a technique where a preset template image is searched for in a picked-up image. In order to perform the template matching, it is required to prepare a template. For instance, there are two usable techniques that are a method, with which the template is set on an image displayed by the setting client 300, and a method with which the template is automatically set from a change detection area.

Figure 15:
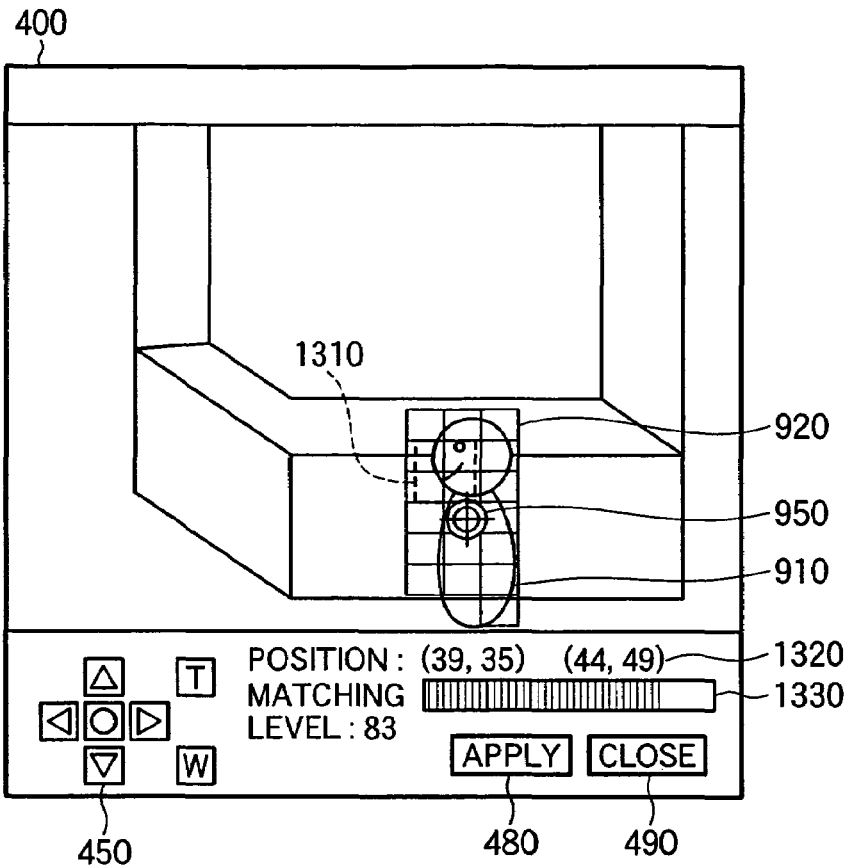
FIG. 15 shows an example of a screen for tracking by template matching.

FIG. 15 shows an example of image displaying by the setting client 300 in the case where the "tracking by template" is set. A tracking target 910 is moving and a template 1310 is positioned on the target. Also, a template position 1320 and a matching level 1330 between the template and the image are displayed in the lower portion of an image display window 400. Here, the position is expressed by four integers (Tx0, Ty0) and (Tx1, Ty1) using the upper left coordinate and the lower right coordinate of the template. The matching level is expressed by an integer M in a range of 0 to 100, although it also depends on a correlation method. Note that the position of the template 1310, the numerical values of the position 1320, and the data of the matching level 1330 are received from the camera server 200. Also, the maximum area 920 change-detected by inter-frame differences and the centroid position 950 of the area 920 are also displayed, so it becomes possible for the user to grasp whether the setting of the template is correct or not with ease.

When the change detection area 440 shown in FIG. 2 is automatically set as the template image, the area integration and labeling process described above are performed when a change is detected and an image in the vicinity of the centroid position of the maximum area is set as the template. Aside from this, it is also possible to set a portion, in which the largest number of edge components has been detected, of the change detection area as the template. Note that it is also possible to designate the tracking target on the picked-up image 920, although in this case, when a point on the image is designated with the mouse cursor, position information at the time of the designation is sent to the camera server 200 and an area having a predetermined size is stored as the template image at the camera server 200.

Figure 16:
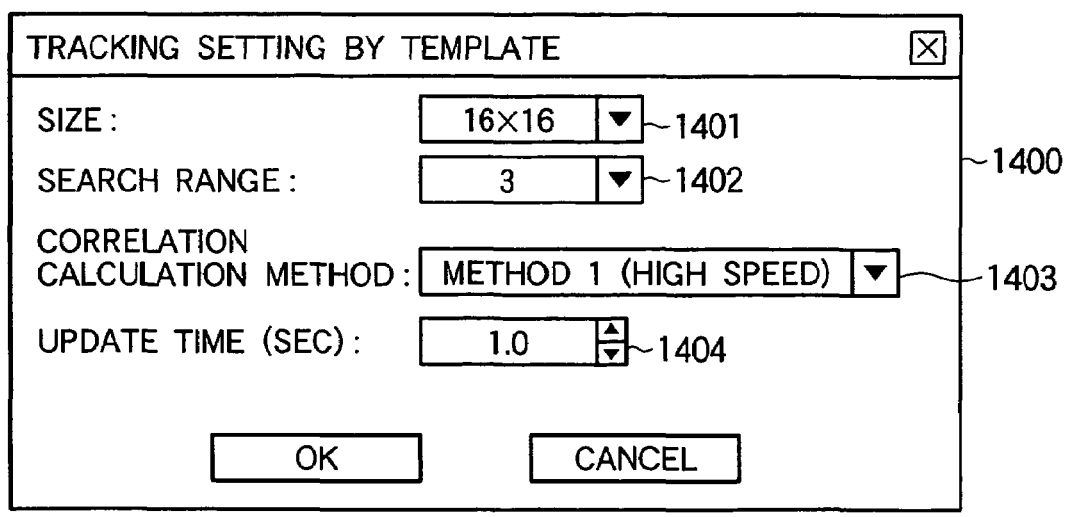
FIG. 16 shows an example of a window for making a setting of the tracking by template matching.

FIG. 16 shows a window 1400 for a setting associated with the template at the tracking setting unit of the setting client 300. Setting information associated with the template is inputted into a template size input field 1401, a search range input field 1402, a correlation calculation method input field 1403, and an update time input field 1404.

The size input field 1401 has multiple size choices such as "16×16" and "24×24". As the size is increased, resistance to noise is increased and stabilized tracking becomes possible, although a process time is also increased. Therefore, it is important to make settings as appropriate. The search range input field 1402 is used to designate the size of the range on the periphery of the current position of the template where the search is to be conducted. As the range is increased, it becomes possible to cope with a larger movement, although a calculation amount is increased. The correlation calculation method input field 1403 has choices, such as a method based on difference sums between pixels that is suited for acceleration of calculation and normalization correlation that is slower than the method described above but does not depend on lightness differences between images, and a selection is made in accordance with a purpose.

The update time input field 1404 is used to designate the maximum time for which the same template image is used continuously. Generally, while the matching level is high, the same template is used continuously and when the matching level is lowered, the template needs to be updated. However, a situation where the same template is used continuously for a too long time is also problematic, so the update time is adjusted as appropriate.

Figure 17:
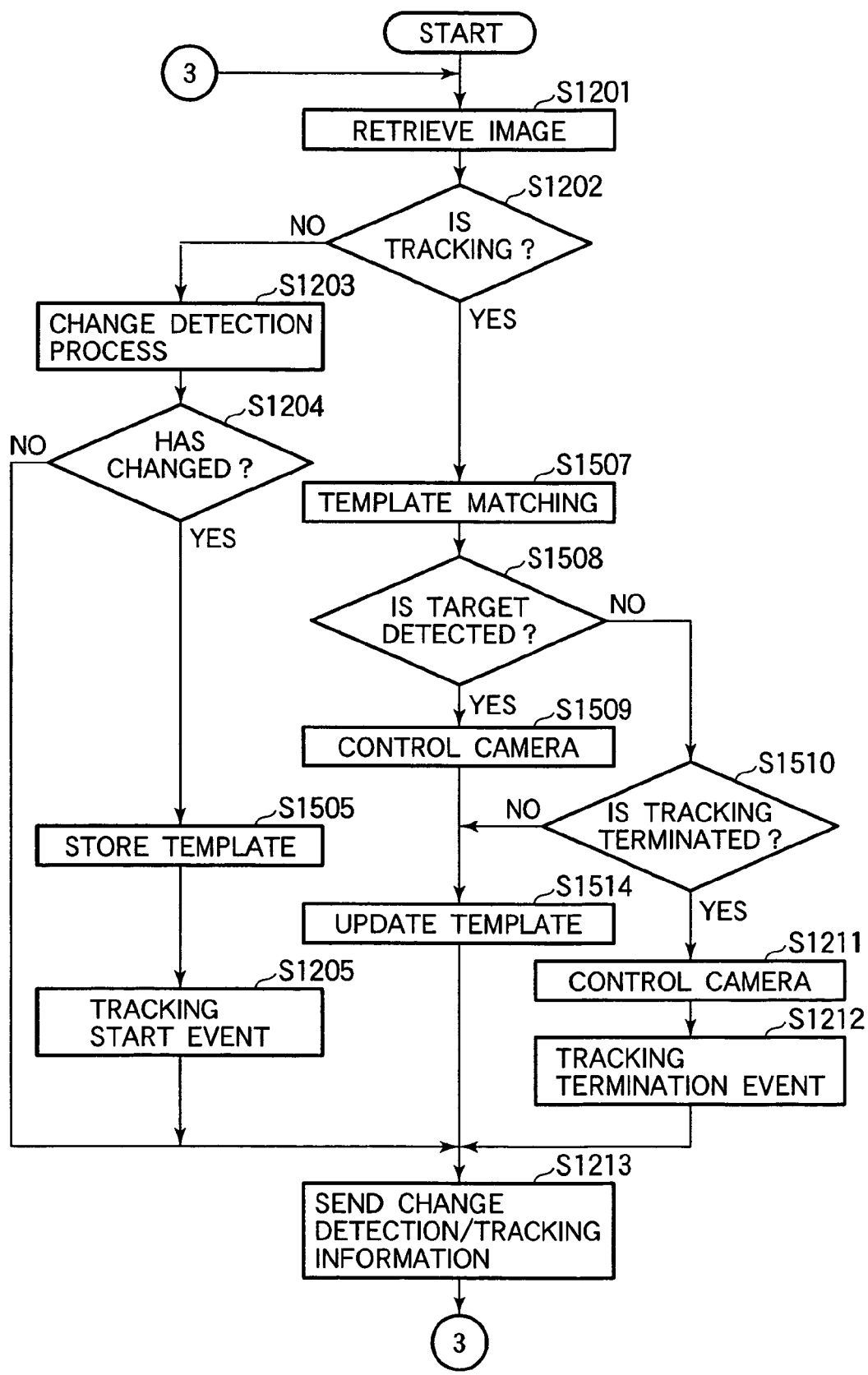
FIG. 17 is a flowchart showing a process procedure of the sub-process of the camera server in the case where the tracking by template matching is performed.

A procedure of the sub-process executed by the CPU of the camera server 200 in order to perform the tracking process by template will be described with reference to FIG. 17. Note that the detailed process of the image change detection is the same as that shown in FIG. 6. Also, in each step given the same reference numeral as in FIG. 14, the same operation is performed, so the description thereof will be omitted.

After the tracking process is started, when it has been judged in step S1204 that an image change exists, the CPU of the camera server 200 stores the template in a storage medium built in the camera server 200 in step S1505. When a template image has been designated in advance from the setting client 300, however, this operation is not performed.

When it has been judged in step S1502 that the current state is the tracking state, the CPU of the camera server 200 performs matching between the template image set in step S1204 or from the setting client 300 and an image obtained from the camera 100 in step S1507 and judges in step S1508 whether a target has been detected. In the judgment operation in step S1508, when the maximum correlation level (matching level) in the search range is equal to or more than a predetermined value, the CPU of the camera server 200 judges that a target has been detected.

When it has been judged in step S1508 that a target has been detected, the CPU of the camera server 200 controls the camera so as to be directed toward the detected target in step S1509. When it has been judged in step S1508 that no target has been detected, the CPU of the camera server 200 judges in step S1510 whether the tracking is to be terminated. In the judgment in step S1510, when a situation where it is impossible to obtain a matching level between the template image and the picked-up image that is equal to or more than a predetermined value has continued for a certain time, the CPU of the camera server 200 judges that track of the tracking target has been lost.

After the operation in step S1509 is finished or when it has been judged in step S1510 that the tracking is not to be terminated, the CPU of the camera server 200 performs a template update process in step S1514. The template update process is a process where because it has been found as a result of the template matching that the matching level is low or because a use time of the current template from the last update has reached the preset template update time, the template image is changed to an image in a corresponding area of the current picked-up image obtained from the camera 100.

(Tracking by Face Detection)

A process in the case where "tracking by face detection" is selected in the window 1000 shown in FIG. 12 will be described. A face detection function is a function of detecting the position and direction of a face with reference to image characteristics such as eyes, a nose, and a mouth.

Figure 18:
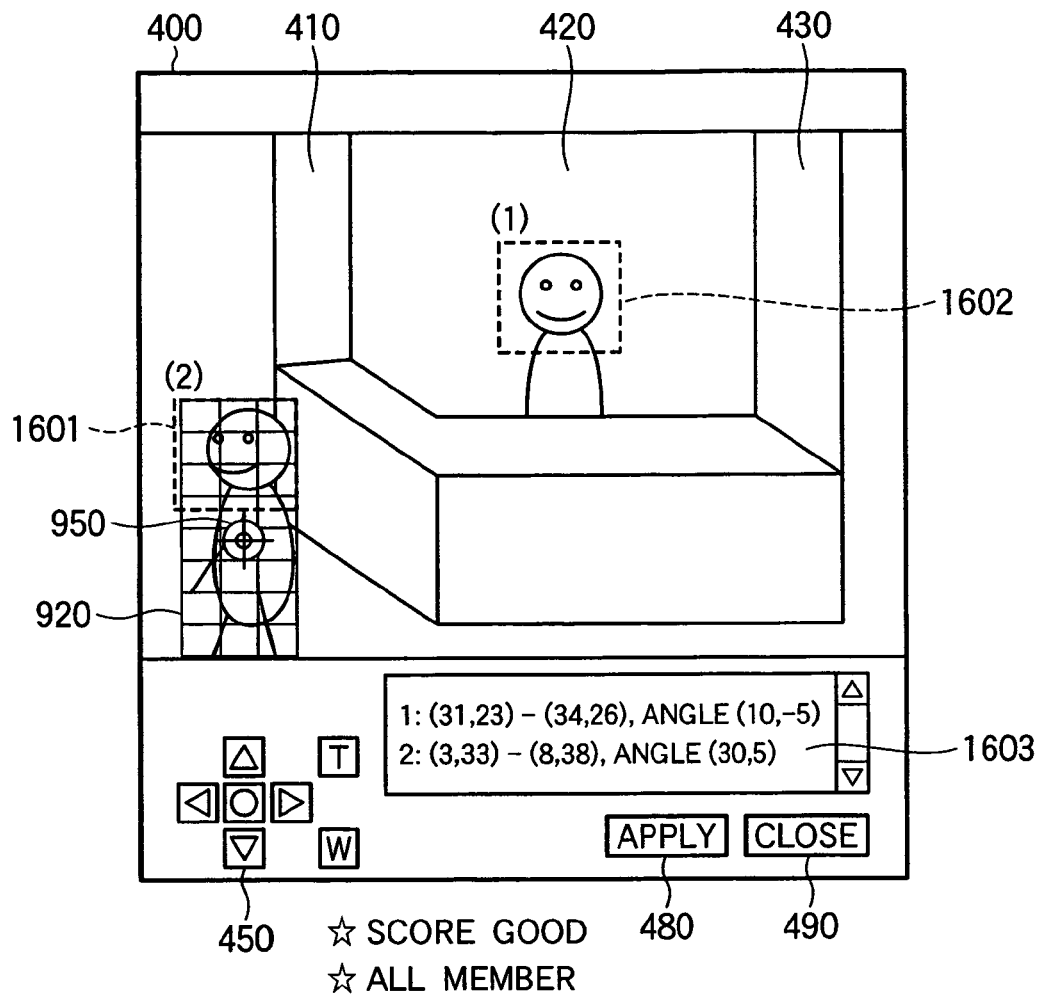
FIG. 18 shows an example of a screen for tracking by face detection.

A state of a face detection/tracking screen of the setting client 300 is shown in FIG. 18. Multiple face areas 1601 and 1602 detected on an image 430 picked up by the camera 100 and received from the camera server 200 are displayed. Also, there is a face detection process where the direction of a face is obtained. The face position and direction are displayed on a face detection list 1603. It is assumed that the face position and direction are detected using a publicly known technique, so the description thereof will be omitted. A result of such face detection is received from the camera server 200 and is displayed. In addition, the maximum area 920 detected upon change in inter-frame differences and the centroid position 950 of the maximum area are also displayed, so it becomes possible for the user to grasp whether the template setting has been made correctly or not with ease.

Figure 19:
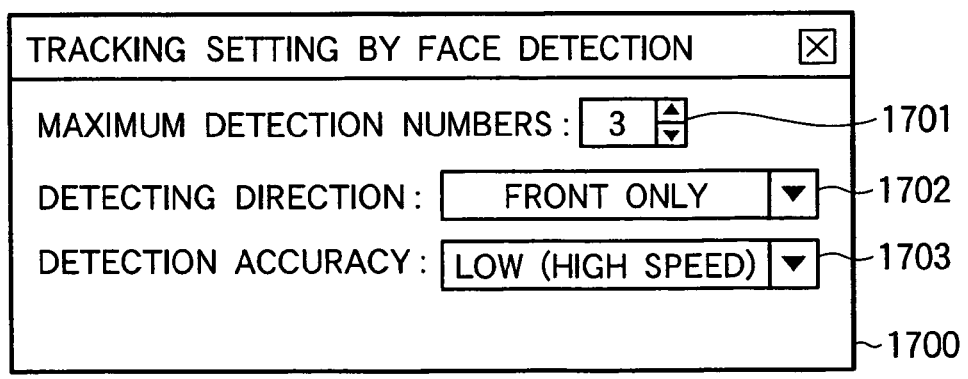
FIG. 19 shows an example of a window for making a setting of the tracking by face detection.

Next, a method for setting face detection parameters at the setting client 300 using a window 1700 shown in FIG. 19 will be described. Note that the window 1700 shown in FIG. 19 is displayed when the "tracking by face detection" is selected in the window 1000 shown in FIG. 12.

As the face detection parameters, three parameters are set which are "maximum detection number", "detection direction", and "detection accuracy". The "maximum detection number" is the maximum number of face images to be detected. By setting a limitation on the number of persons to be detected, it becomes possible to exclude areas, whose probabilities for being a face are low, midway through the detection and to accelerate a detection process. The "detection direction" limits face detection corresponding to rotation around an axis vertical to a screen. In a system required to use a detection filter multiple times depending on the face direction, acceleration is expectedly achieved by limiting the detection direction. The "detection accuracy" is a parameter for increasing or decreasing the face detection accuracy. More specifically, this parameter is a parameter for setting filters to be used to narrow down face candidates and process simplification and it is possible to strike a balance between accuracy and speed by appropriately setting the number of filters.

Figure 20:
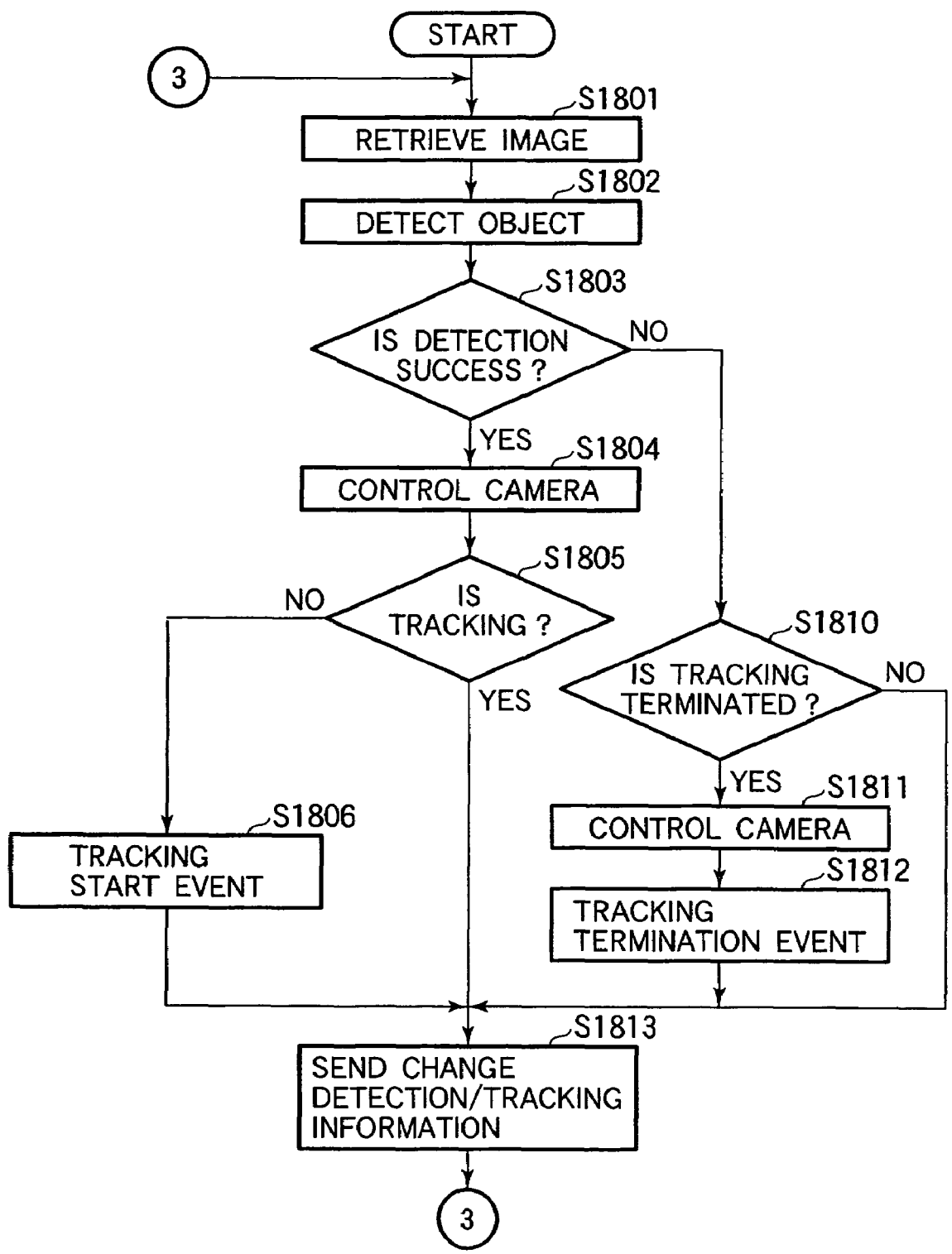
FIG. 20 is a flowchart showing a process procedure of the sub-process of the camera server in the case where the tracking by face detection is performed.

Next, a procedure of the sub-process executed by the CPU of the camera server 200 in the case where the tracking process by face detection is set will be described with reference to FIG. 20.

In the change detection state, the camera server 200 performs a face detection process with respect to the whole of a picked-up image. Following this, when having detected a face, the camera server 200 shifts to the tracking state. Even in the tracking state, the face detection process is performed like in the detection state. In the tracking state, however, the face detection process is performed with respect to an image in the vicinity of a tracking target, so even when multiple faces exist at the same time, it is possible to perform the target tracking. Alternatively, it is also possible to use a technique with which the same face is tracked through recognition with reference to face characteristic similarity and arrangement using a publicly known face recognition process.

After settings of the tracking process are made, the CPU of the camera server 200 retrieves a picked-up image from the camera 100 in step S1801 and performs the face detection process in step S1802. Next, the CPU of the camera server 200 judges in step S1803 whether the detection is success. When it has been judged in step S1803 that the detection is success, the process proceeds to step S1804 in which the CPU of the camera server 200 performs camera control. Here, in step S1803, when at least one of detected face images is equal to or more than a predetermined evaluation value, it is judged that the detection is success. The evaluation value is a value for determining face probability and depends on which face detection system is used. When a face has been detected, the process proceeds to step S1805 in which the CPU of the camera server 200 judges whether the current state is the tracking state. When it has been judged in step S1805 that the current state is not the tracking state, the process proceeds to step S1806 in which the CPU of the camera server 200 issues a tracking start event to the setting client 300. Then, the process proceeds to step S1813. On the other hand, when it has been judged in step S1805 that the current state is the tracking state, the process proceeds to step S1813. In step S1813, the CPU of the camera server 200 sends face detection information to the setting client 300. Then, the process returns to step S1801 and the CPU of the camera server 200 continues the process.

When it has been judged in step S1803 that the detection is not success, the process proceeds to step S1810 in which the CPU of the camera server 200 judges whether the tracking state is to be terminated. When continuous face detection has ended in failure, it is judged in step S1810 that the tracking state is to be terminated. When it has been judged in step S1801 that the tracking state is to be terminated, when a specific preset is monitored, for instance, the CPU of the camera server 200 performs camera control to a predetermined position in step S1811. Next, in step S1812, the CPU of the camera server 200 issues a tracking termination event to the setting client. Then, the process proceeds to step S1813. When it has been judged in step S1810 that the tracking state is to be continued, the process proceeds to step S1813 in which the CPU of the camera server 200 sends tracking information to the setting client 300.

It should be noted here that in this embodiment, when multiple persons exist as tracking targets, the zoom of the camera 100 is controlled to a wide-angle side so that the multiple persons are contained or control is performed using a frame difference method so that an area close to a change-detected area is tracked, for instance.

(Displaying of Recommendation Comment and Parameter)

Sufficient accuracy with a certain tracking method may not be obtained because, for instance, it is impossible to obtain certain illuminance due to an influence of the installation place of the camera 100. In view of this problem, in this embodiment, an image picked up by the camera 100 and distributed from the camera server 200 is referred to and a tracking method recommendation message is displayed in a comment column 1001 of the window 1000 in accordance with the average value of brightness of the picked-up image.

Figure 21:
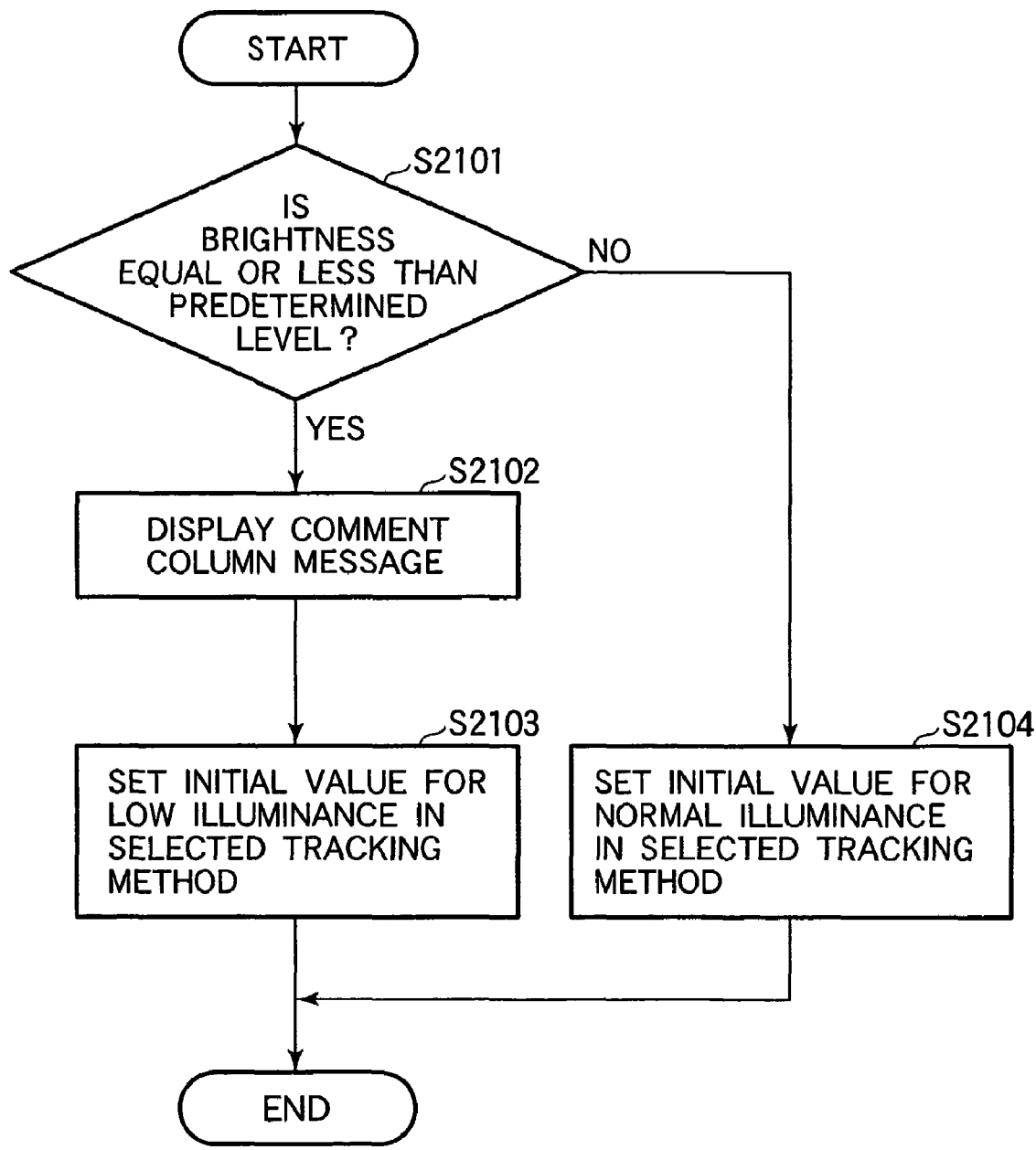
FIG. 21 is a flowchart showing a display process of the setting client.

FIG. 21 is a flowchart of an operation process executed by the CPU of the setting client 300 in order to display the message.

In FIG. 21, in step S2101, the CPU of the setting client 300 calculates an average value of brightness of an image picked up by the camera 100 and distributed from the camera server 200. When the average value of the brightness of the picked-up image is more than a predetermined level, the process proceeds to step S2104 in which ordinary initial setting values are displayed in the input fields 1401 to 1404 of a setting window for a selected tracking method.

On the other hand, when the average value of the brightness of the picked-up image is equal to or less than the predetermined level, the process proceeds to step S2102 in which a message "tracking by template is recommended" is displayed in the comment column 1001 of the window 1000 because the tracking by template can be performed with low illuminance as compared with other methods and is hard to be influenced by noise and the like.

Then, the process proceeds to step S2103 in which initial setting values for low illuminance in the selected tracking method are displayed in the input fields of the window.

When the "tracking by template" is selected, for instance, a value that is greater than a value displayed in step S2104 is displayed on the window 1400 shown in FIG. 16 as the template image size. For instance, a value "30×30" is displayed as the initial setting value of the template image size. Then, the search range is set a little too wide and a "method 2" with higher accuracy is displayed as the initial setting value of the "correlation calculation method". Then, a value that is greater than a value displayed in step S2104 is displayed as the "update time".

For instance, when a situation is detected in which the "tracking by face detection" has been selected in spite of a fact that the "tracking by template" is recommended, only a choice "front only" of the face detection direction is displayed and other choices of the face detection direction are not displayed.

It should be noted here that it is assumed that when the "tracking by frame difference" or the "tracking by color detection" is selected in spite of a fact that the "tracking by template" is recommended, the same initial setting displaying as in step S2104 is performed because it is impossible to say that the selected tracking has parameters for which a recommendation can be provided in accordance with illuminance.

As described above, a tracking method recommendation message and recommended settings are displayed in accordance with the brightness of the image picked up by the camera 100, so it becomes possible for the user to make appropriate settings.

Other Embodiment

Concurrently with the image process for tracking performed at the camera server in the manner described above, an image change detection process and an image process for tracking that are the same as those performed at the camera server may be performed at the setting client. In this case, it becomes unnecessary for the setting client to receive a result of the tracking process from the camera server, so it becomes possible to reduce the amount of communication between the setting client and the camera server.

Figure 22:
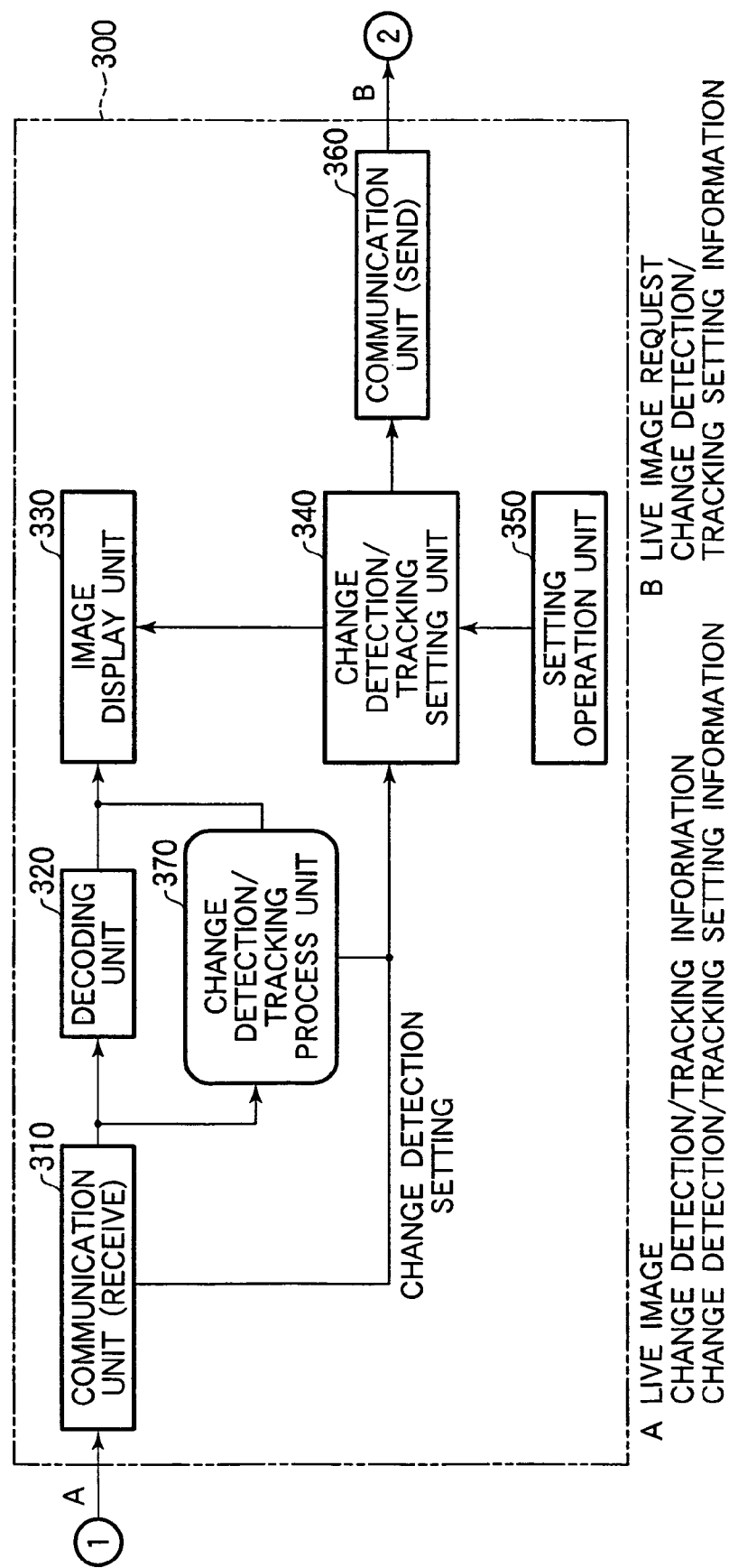
FIG. 22 shows an example of a construction of a setting client in another embodiment of the present invention.

FIG. 22 is a block diagram showing an example of a construction of a setting client 300' according to this embodiment.

In FIG. 22, the setting client 300' includes a change detection/tracking process unit 370 in addition to a communication unit (receive) 310, a decoding unit 320, an image display unit 330, a change detection/tracking setting unit 340, a setting operation unit 350, and a communication unit (send) 360 that are the same as those of the setting client 300 shown in FIG. 1. Note that a construction of the camera server 200 is the same as that shown in FIG. 1.

The setting client 300' performs a process, which is the same as the image process/change detection process performed at the camera server 200 in the embodiment described above, at the time of reception of an image from the camera server 200.

Then, the setting client 300' makes a calculation and displays the change detection block 440, the area ratio 622, and the change detection result icon 642 based on a result of the calculation in the case of the image change detection process state. On the other hand, in the case of the tracking state, the setting client 300' displays the maximum area belonging change detection block value 920, the target marker (centroid position) 950, and the change detection result/tracking state icon 642. Here, only the image process is performed as the tracking process and therefore camera control is not performed.

As described above, according to this embodiment, the setting client 300' performs the image change detection process and the image process for tracking that are the same as those performed at the camera server 200, so information that the setting client 300' obtains from the camera server 200 becomes only images. As a result, the amount of communication between the setting client 300' and the camera server 200 can be reduced, which makes it possible to make settings concerning the image change detection function and the tracking function of the camera server 200 from the setting client 300' even through a line whose capacity is small.

Figure 23:
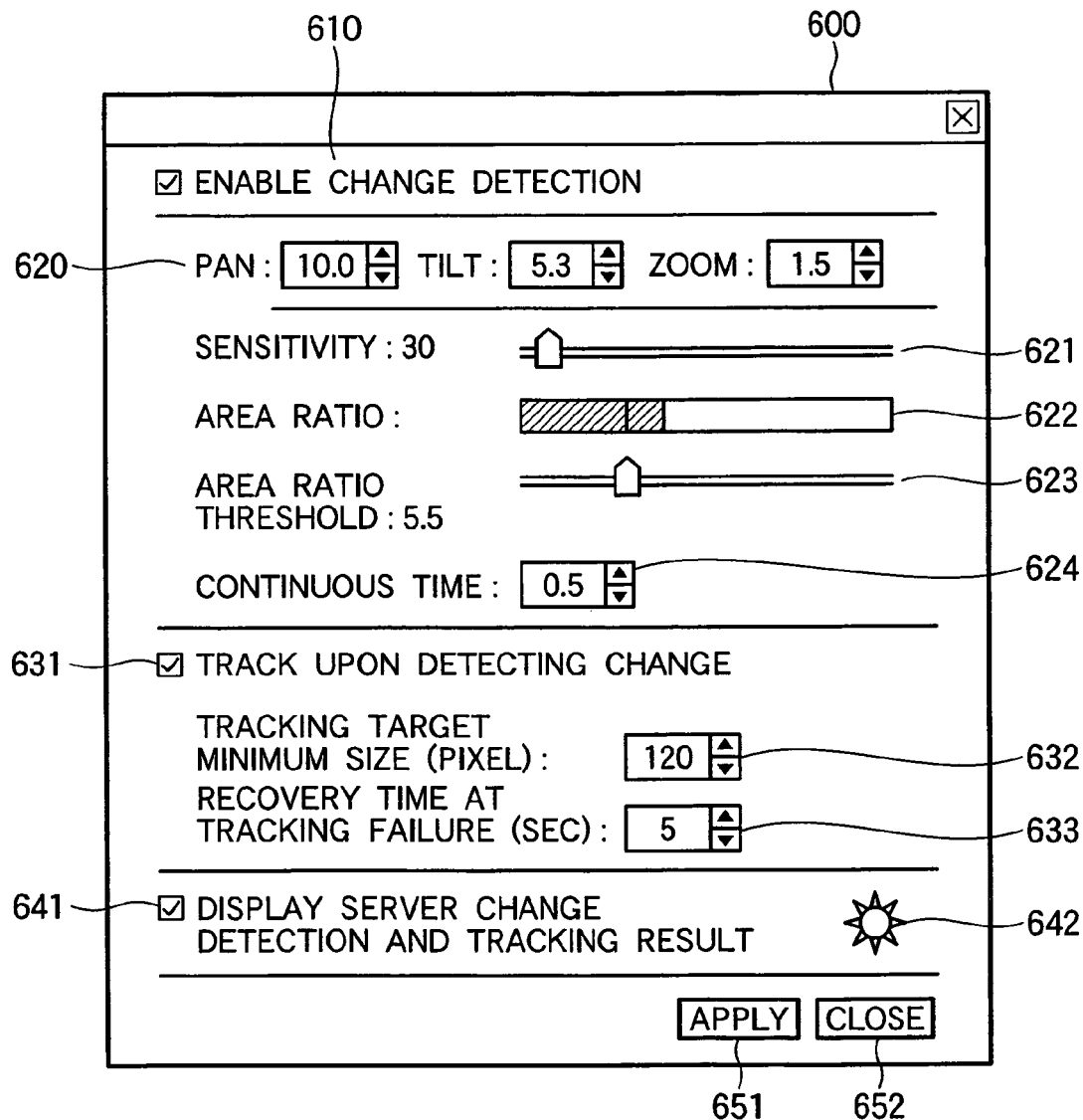
FIG. 23 shows an example of a setting window displayed on a setting client side in the other embodiment.

It should be noted here that it is possible to select whether the setting client 300 displays a result of an operation performed on a camera server 200 side or performs the operation by itself through, for instance, a setting using a window 600 shown in FIG. 23. In this case, when a check box 641 "display server change detection and tracking result" provided on the window 600 is clicked in, a result of change detection performed on the camera server 200 side is displayed. On the other hand, when the check box 641 is not clicked in, a result of the operation performed on a client 300 side is displayed.

It should be noted here that it is also possible to make the setting of the parameters while performing every process containing the camera control in the tracking state at the setting client 300. In this case, the camera control is performed based on a result of the image process performed on the setting client 300 side, so there is an advantage that results of the image change detection process and the tracking process displayed on the image display window completely coincide with the tracking operation of the camera. As a result, it becomes possible to make correct settings concerning the image change detection function and the tracking function of the camera server 200.

(Hardware Construction)

It is possible to realize the functions of the camera server and the setting client in the embodiments described above by supplying a computer or a CPU with a program of software achieving the functions and causing the computer or the CPU to read and execute the supplied program.

In this case, the program is directly supplied from a storage medium recording the program or is supplied through downloading from another computer, database, or the like (not shown) connected to the Internet, a commercial network, a local area network, or the like.

The form of the program described above is, for instance, an object code, a program code executed by an interpreter, or script data supplied to an operating system (OS).

Also, it is possible to realize the functions in the embodiments described above by supplying a CPU of a computer constituting the camera server or the setting client with the storage medium storing the program of the software achieving the functions and causing the CPU to read and execute the program stored in the storage medium.

In this case, the program code itself read from the storage medium realizes the functions in the embodiments described above and the storage medium storing the program code constitutes the present invention.

Examples of the storage medium storing the program code include a ROM, a RAM, a hard disk, an MO, a CD-R, a CD-RW, a DVD-ROM, a DVD-RAM, a DVD-RW, a DVD+RW, and a nonvolatile memory card.

The functions in the embodiments described above may be accomplished not only by executing the program code read by the computer but also by causing an OS or the like running on the computer to perform a part or all of the actual process based on instructions of the program code.

In addition, it is possible to achieve the embodiments described above by downloading the program of the software from a database or a home page on a network to the camera server or the setting client using a communication program and reading and executing the downloaded program.

It is also possible to supply the program by establishing connection to a home page on the Internet using a browser of a client computer and downloading the computer program itself or a compressed file containing an automatic installation function from the home page to a storage medium such as a hard disk.

This application claims priorities from Japanese Patent Applications No. 2004-085510 filed Mar. 23, 2004 and No. 2005-073335 filed Mar. 15, 2005, which are hereby incorporated by reference herein.

What is claimed is:

1. A monitoring system comprising:
a camera server that has a camera whose image pickup direction is controllable; and
a setting client at which a tracking method of the camera server is set through a network,
wherein the camera server includes:
detection means for detecting a moving object in a picked-up image obtained from the camera, based on preset setting information of the tracking method;
tracking control means for controlling the camera to perform tracking based on a result of the detection by the detection means; and
transmission means for sending the result of the detection by the detection means and the picked-up image to the setting client, and the setting client includes:
reception means for receiving the result of the detection by the detection means and the picked-up image from the camera server;
window display means for displaying an image display window, in which the received picked-up image obtained from the camera and an indicator to indicate a change detection maximum area as the result of the detection by the detection means are superimposingly displayed, and a setting window to make a setting of a tracking method by referring to an image displayed in the image display window; and
transmission means for, when detected that setting information concerning a setting of the tracking control means has been changed through the setting window, sending the changed setting information to the camera server.

2. A monitoring system according to claim 1,
wherein the window display means displays a tracking method selection window to make a selection of a tracking method to be executed by the tracking control means of the camera server from among tracking by inter-frame differences, tracking by color detection, tracking by template, and tracking by face detection.

3. A monitoring system according to claim 2,
wherein when brightness of the picked-up image received by the reception means is equal to or less than a predetermined level, the window display means displays a message to recommend the tracking by template in the tracking method selection window.

4. A monitoring system according to claim 2,
wherein when one of the tracking by template and the tracking by face detection has been selected through the tracking method selection window and brightness of the picked-up image received by the reception means is equal to or less than a predetermined level, the window display means changes an initial setting of corresponding one of a window for making a setting of the tracking by template and a window for making a setting of a face area.

5. A tracking setting method for a monitoring system where a setting of a tracking method of the camera server is set at a setting client through a network, a camera server that having a camera whose image pickup direction is controllable,
the tracking setting method comprising:
detecting, at the camera server, a moving object in a picked-up image obtained from the camera based on preset setting information of the tracking method;
controlling, at the camera server, the camera to perform tracking based on a result of the detection;
sending the result of the detection and the picked-up image from the camera server to the setting client;
receiving, at the setting client, the result of the detection and the picked-up image from the camera server;
displaying, at the setting client, an image display window, in which the received picked-up image obtained from the camera and an indicator to indicate a change detection maximum area as the result of the detection are superimposingly displayed, and a setting window to make a setting of a tracking method by referring to an image displayed in the image display window; and
sending, when detected that setting information concerning the tracking has been changed through the setting window, the changed setting information from the setting client to the camera server.

6. A tracking setting method according to claim 5,
wherein the window display includes displaying a tracking method selection window to make a selection of a tracking method to be executed in the tracking control of the camera server from among tracking by inter-frame differences, tracking by color detection, tracking by template, and tracking by face detection.

7. A tracking setting method according to claim 6,
wherein when brightness of the picked-up image received is equal to or less than a predetermined level, the window display further includes displaying a message to recommend the tracking by template in the tracking method selection window.

8. A tracking setting method according to claim 6,
wherein when one of the tracking by template and the tracking by face detection has been selected through the tracking method selection window and brightness of the picked-up image received is equal to or less than a predetermined level, the window display includes changing an initial setting of corresponding one of a window for making a setting of the tracking by template and a window for making a setting of a face area.

9. A computer program encoded on a computer readable medium that causes a setting client, at which a setting of a tracking method of the camera server is set through a network, a camera server having a camera whose image pickup direction is controllable, to perform a process comprising:
receiving, from the camera server, a result of detection of a moving object and a picked-up image;
displaying an image display window, in which the picked-up image received from the camera server and an indicator to indicate a change detection maximum area as the result of the detection are superimposingly displayed, and a setting window to make a setting of a tracking method by referring to an image displayed in the image display window; and
sending, when detected that setting information concerning tracking performed by the camera has been changed through the setting window, the changed setting information to the camera server.

* * * * *